(12) United States Patent
Yamamoto et al.

(10) Patent No.: US 8,361,613 B2
(45) Date of Patent: *Jan. 29, 2013

(54) COATING COMPOSITION FOR ELECTROPHORETIC DISPLAY DEVICES, SHEET FOR ELECTROPHORETIC DISPLAY DEVICES, PROCESS FOR ITS PRODUCTION, AND ITS APPLICATIONS

(75) Inventors: Hitoshi Yamamoto, Chino (JP);
Harunobu Komatsu, Matsumoto (JP);
Tomoyuki Kuwamoto, Suita (JP);
Mitsuo Kushino, Suita (JP)

(73) Assignees: Seiko Epson Corporation, Tokyo (JP);
Nippon Shokubai Co., Ltd., Osaka (JP)

( * ) Notice: Subject to any disclaimer, the term of this patent is extended or adjusted under 35 U.S.C. 154(b) by 694 days.

This patent is subject to a terminal disclaimer.

(21) Appl. No.: 12/222,862

(22) Filed: Aug. 18, 2008

(65) Prior Publication Data

US 2009/0061209 A1 Mar. 5, 2009

(30) Foreign Application Priority Data

Sep. 4, 2007 (JP) ................................. 2007-229337

(51) Int. Cl.
*B32B 5/16* (2006.01)
*B05D 5/12* (2006.01)
*C08L 33/08* (2006.01)

(52) U.S. Cl. ......................................... 428/327; 427/58

(58) Field of Classification Search .................. None
See application file for complete search history.

(56) References Cited

U.S. PATENT DOCUMENTS

| 5,039,720 | A | 8/1991 | Saatweber et al. |
| 6,392,786 | B1 | 5/2002 | Albert |
| 6,417,297 | B1 | 7/2002 | Mayer et al. |
| 7,009,756 | B2 * | 3/2006 | Kishi et al. ................ 359/296 |
| 7,279,121 | B2 * | 10/2007 | Hayashi ..................... 264/4.33 |
| 7,365,900 | B2 | 4/2008 | Yamamoto |

(Continued)

FOREIGN PATENT DOCUMENTS

| EP | 0 723 975 | 7/1996 |
| JP | 50-15115 | 6/1975 |

(Continued)

OTHER PUBLICATIONS

Machine translation of JP H11-052349.*

(Continued)

*Primary Examiner* — Mark Ruthkosky
*Assistant Examiner* — Alexandre Ferre
(74) *Attorney, Agent, or Firm* — Wenderoth, Lind & Ponack, L.L.P.

(57) ABSTRACT

The coating composition for electrophoretic display devices according to the present invention contains microcapsules for electrophoretic display devices and a binder resin, wherein the binder resin has a glass transition temperature (Tg) in a range of from −85° C. to −10° C. as calculated by FOX formula and has a residual monomer concentration of 500 ppm or lower in a solid content thereof. The sheet for electrophoretic display devices according to the present invention has a microcapsule layer formed from the above-described coating composition for electrophoretic display devices on a base material sheet. The sheet for electrophoretic display devices according to the present invention can be used, as its applications, for electrophoretic display devices using the sheets, and electronic equipments using the electrophoretic display devices.

8 Claims, 3 Drawing Sheets

U.S. PATENT DOCUMENTS

| | | |
|---|---|---|
| 2004/0012106 A1 | 1/2004 | Kanbe et al. |
| 2005/0129946 A1* | 6/2005 | Hayashi ..................... 428/402.2 |
| 2005/0259312 A1* | 11/2005 | Miyazaki et al. ............. 359/296 |
| 2007/0009739 A1 | 1/2007 | Kanbe et al. |
| 2007/0097489 A1 | 5/2007 | Doshi et al. |
| 2007/0173154 A1* | 7/2007 | Hartmann et al. ............ 442/156 |
| 2007/0297038 A1 | 12/2007 | Chopra et al. |
| 2007/0298337 A1 | 12/2007 | Hayashi |
| 2008/0158651 A1 | 7/2008 | Kawase et al. |
| 2008/0204855 A1 | 8/2008 | Yamamoto |
| 2009/0059349 A1 | 3/2009 | Yamamoto et al. |
| 2009/0127728 A1 | 5/2009 | Kanbe et al. |

FOREIGN PATENT DOCUMENTS

| | | |
|---|---|---|
| JP | 5-53553 | 8/1993 |
| JP | 2551783 | 8/1996 |
| JP | 8-239539 | 9/1996 |
| JP | 11-52349 | 2/1999 |
| JP | 2001-55405 | 2/2001 |
| JP | 2002-526812 | 8/2002 |
| JP | 2004-102235 | 4/2004 |
| JP | 2005-70567 | 3/2005 |
| JP | 2005-84267 | 3/2005 |
| JP | 2005-169248 | 6/2005 |
| JP | 2005-345738 | 12/2005 |
| JP | 2006-258981 | 9/2006 |
| JP | 2007-131658 | 5/2007 |
| JP | 2007-192945 | 8/2007 |
| JP | 2007-213014 | 8/2007 |
| JP | 2007-219503 | 8/2007 |
| JP | 2008-58542 | 3/2008 |
| JP | 2008-107484 | 5/2008 |
| JP | 2008-116513 | 5/2008 |
| JP | 2008161859 A * | 7/2008 |
| JP | 2008-209526 | 9/2008 |
| JP | 2008-241806 | 10/2008 |
| WO | 00/20922 | 4/2000 |

OTHER PUBLICATIONS

Machine translation of JP 2001-055405.*

Machine Translation of JP 2008161859.*

English translation of Notice of Reasons for Rejection dated Mar. 31, 2009 issued in connection with Japanese Patent Application No. 2007-220318 corresponding to U.S. Appl. No. 12/222,999.

Advisory Action dated Feb. 25, 2010 issued in U.S. Appl. No. 12/222,999.

English translation of Notice of Reasons for Rejection dated Sep. 1, 2009 issued in connection with Japanese Patent Application No. 2007-220318.

Full English translation of Office Action dated Jul. 28, 2009 issued in connection with Japanese priority application corresponding to present U.S. application.

Full English translation of JP 11-52349 published Feb. 26, 1999.

Full English translation of JP 2007-131658 published May 31, 2007.

* cited by examiner

COATING COMPOSITION FOR ELECTROPHORETIC DISPLAY DEVICES, SHEET FOR ELECTROPHORETIC DISPLAY DEVICES, PROCESS FOR ITS PRODUCTION, AND ITS APPLICATIONS

BACKGROUND OF THE INVENTION

1. Field of the Invention

The present invention relates to a coating composition for electrophoretic display devices, a sheet for electrophoretic display devices, a process for its production, and its applications (specifically, electrophoretic display devices and electronic equipments).

2. Description of the Related Art

An electrophoretic display device displays character data, image data, and the like, by the behavior of electrophoretic particles, for example, when a voltage is applied to a dispersion in which the electrophoretic particles are dispersed in a solvent. For example, if the electrophoretic particles and the solvent are colored with different colors, the color of the electrophoretic particles is observed when the electrophoretic particles are moved to the surface of the solvent by voltage application, and the color of the dispersion is observed when the electrophoretic particles are moved to the bottom of the solvent. If electrodes to which voltage application is made possible by address appointment are provided, different colors for the respective addresses can be displayed, and accordingly, arbitrary character data and image data can be displayed. Moreover, it is possible to rewrite the display data, and at the same time, it is advantageous that the display data can be maintained as it is, even if there is no electric signal.

In recent years, in place of the conventional electrophoretic display devices (e.g., see Japanese Patent Publication No. Sho 50-15115) in which a dispersion of electrophoretic particles are enclosed in spaces between opposed electrode substrates, there have been developed microcapsule type electrophoretic display devices (e.g., see Japanese Patent No. 2551783) with a structure in which microcapsules enclosing a dispersion of electrophoretic particles are arranged between opposed electrode substrates. As compared with the conventional electrophoretic display devices, the microcapsule type electrophoretic display devices are remarkably improved in various performances and functions, such as long-term stability of display, responsiveness, contrast, and display rewritable times.

For the electrophoretic display devices, there have also been proposed, besides fixed equipments such as ordinary displays, techniques of flexible displays, which have the shape of a thin sheet, which are ultraportable, and which can freely be inflected, such as electronic papers and electronic books.

In such electrophoretic display devices, there has been proposed a technique of making a dispersion of electrophoretic particles, i.e., a dispersion for electrophoretic display devices, into microcapsules (see, e.g., Japanese Patent Laid-open Publication No. 2002-526812). A flexible sheet-shaped electrophoretic display device can easily be produced by enclosing a dispersion for electrophoretic display devices in microsphere-shaped microcapsules made of a transparent resin or the like and allowing the thus obtained microcapsules for electrophoretic display devices to be supported on the surface of a base material sheet. There occurs neither uneven local distribution nor movement of a dispersion for electrophoretic display devices by making the dispersion for electrophoretic display devices into microcapsules, resulting in a technique also suitable for various applications in which electronic equipments may variously change their positions or may be inflected when used, such as electronic papers.

A flexible sheet-shaped electrophoretic display device is produced, for example, by applying a coating solution containing microcapsules for electrophoretic display devices and a binder resin to an electrode film, followed by drying, to form a microcapsule layer on the surface of the electrode film, and subsequently laminating an opposite electrode film on the side of the microcapsule layer. In ordinary cases, as the binder resin, there can be used a binder resin formed of a copolymer having a glass transition temperature (Tg) in a range of from 0° C. to 20° C., and the lamination of an opposite electrode film is carried out at a temperature of from 100° C. to 120° C.

However, it is a current status that any of the heretofore known sheet-shaped electrophoretic display devices can have not so much high adhesiveness between the electrode films and the microcapsules layer and can exhibit no sufficiently acceptable contrast.

SUMMARY OF THE INVENTION

Under the above-described circumstances, it is an object of the present invention to provide a coating composition for electrophoretic display devices, which can produce electrophoretic display devices having high adhesiveness between the base material sheets (e.g., electrode films) and the microcapsule layer and having improved contrast; a sheet for electrophoretic display devices and a process for its production; and electrophoretic display devices and electronic equipments, both of which are obtained using such a sheet for electrophoretic display device.

The present inventors have made various studies, and as a result, they have found that, in the preparation of a coating composition for electrophoretic display devices, if a binder resin is used having a glass transition temperature (Tg) in a range of from −85° C. to −10° C. as calculated by FOX formula, and at the same time, a residual monomer concentration is suppressed to 500 ppm or lower in the solid content of the bonder resin, then electrophoretic display devices finally obtained become to have high adhesiveness between the base material sheets (e.g., electrode films) and the microcapsule layer and have improved contrast. Thus, the present invention has been completed.

That is, the present invention provides a coating composition for electrophoretic display devices, comprising microcapsules for electrophoretic display devices and a binder resin, wherein the binder resin has a glass transition temperature (Tg) in a range of from −85° C. to −10° C. as calculated by FOX formula and has a residual monomer concentration of 500 ppm or lower in a solid content thereof. In the coating composition for electrophoretic display devices, the binder resin may preferably comprise a (meth)acrylic copolymer. In addition, each of the microcapsules may preferably comprise an inner shell made of a mercapto group-containing amino resin and an outer shell made of an epoxy resin.

The present invention further provides a sheet for electrophoretic display devices, comprising a microcapsule layer formed from the above-described coating composition for electrophoretic display devices on a base material sheet. In the sheet for electrophoretic display devices, the base material sheet may preferably comprise an electrically conductive film.

The present invention further provides a process for producing a sheet for electrophoretic display devices, comprising applying the above-described coating composition for electrophoretic display devices to a base material sheet, followed by drying, to form a microcapsule layer on the base material sheet. In the production process, the base material sheet may preferably comprise an electrically conductive film.

The present invention further provides an electrophoretic display device comprising a data displaying part, wherein the data displaying part may comprise the above-described sheet for electrophoretic display devices.

The present invention further provides an electronic equipment comprising a data displaying means, wherein the data displaying means may comprise the above-described electrophoretic display device.

The coating composition for electrophoretic display devices according to the present invention contains a binder resin having a glass transition temperature (Tg) in a range of from −85° C. to −10° C. as calculated by FOX formula, and at the same time, a residual monomer concentration in the solid content of the binder resin is suppressed to 500 ppm or lower; therefore, it makes it possible to produce electrophoretic display devices having high adhesiveness between the base material sheets (e.g., electrode films) and the microcapsules layer and having improved contrast.

The sheet for electrophoretic display devices according to the present invention can produce such an electrophoretic display device in an easy and simple manner, for example, only by laminating another base material sheet (e.g., an electrode film) on the side of the microcapsule layer in the sheet for electrophoretic display devices.

The process for producing a sheet for electrophoretic display devices according to the present invention can produce such a sheet for electrophoretic display devices in an easy and simple manner, for example, only by applying a coating composition for electrophoretic display devices to a base material sheet, followed by drying, to form a microcapsule layer on the base material sheet. In particular, when the sheet for electrophoretic display sheet is a display sheet in which an opposite electrode film is laminated on the side of the microcapsule layer, a binder resin contained in the coating composition for electrophoretic display devices has a glass temperature (Tg) in a range of from −85° C. to −10° C. as calculated by FOX formula, so that the lamination can be carried out at a temperature lower than the conventional one, for example, at 100° C. or lower, and therefore, electronic parts, such as integrated circuits (ICs), which have been formed on the electrode film, can be protected.

The electrophoretic display device and electronic equipments according to the present invention can exhibit excellent display performance such as contrast because of their using the above-described sheet for electrophoretic display devices.

As described above, the coating composition for electrophoretic display devices according to the present invention can produce electrophoretic display devices having high adhesiveness between the base material sheets (e.g., electrode films) and the microcapsule layer and having improved contrast. In addition, the sheet for electrophoretic display devices according to the present invention is useful for the production of electrophoretic display devices and electronic equipments, both of which can exhibit high display performance. Further, the process for producing a sheet for electrophoretic display devices according to the present invention can produce such a sheet for electrophoretic display devices in an easy and simple manner. Therefore, the coating composition for electrophoretic display devices, the sheet for electrophoretic display devices, its production process and its applications, all of which are provided by the present invention, make a great contribution in various fields related to electronic equipments using display devices to which electrophoretic display devices are available or applicable.

DETAILED DESCRIPTION OF THE PREFERRED EMBODIMENTS

<<Coating Composition for Electrophoretic Display Devices>>

Figure 1:
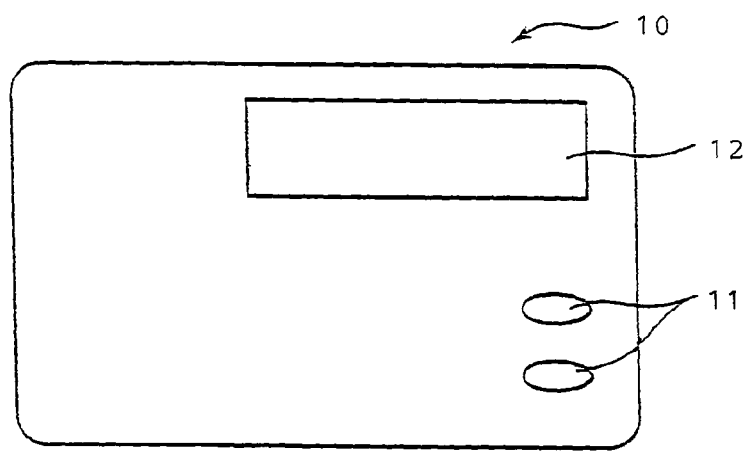
FIG. 1 is a plan view showing one example of an IC card which is one embodiment of the electronic equipment of the present invention.

The coating composition for electrophoretic display devices according to the present invention (hereinafter sometimes referred to as "the coating composition of the present invention" or simply the "coating composition") comprises microcapsules for electrophoretic display devices (hereinafter sometimes referred to as simply the "microcapsules") and a binder resin, wherein the binder resin has a glass transition temperature (Tg) in a range of from −85° C. to −10° C. as calculated by FOX formula and has a residual monomer concentration of 500 ppm or lower in a solid content thereof.

The following will describe in detail the coating composition of the present invention. However, the coating composition of the present invention is not restricted to the following descriptions, and besides the following exemplified matter, it can be put into practice after appropriate modifications or variations within such a range that the gists of the present invention are not adversely affected.

<Binder Resin>

The binder resin to be incorporated into the coating composition of the present invention is not particularly limited, so long as it has a glass transition temperature (Tg) in a range of from −85° C. to −10° C. as calculated by FOX formula. Examples of the binder resin may include synthetic resin binders such as acrylic resins, polyester resins, fluorocarbon polymers, alkyd resins, amino resins, vinyl resins, epoxy resins, polyamide resins, urethane resins, unsaturated polyester resins, phenol resins, polyolefin resins, silicone resins, acryl-silicone resins, xylene resins, ketone resins, rosin-modified maleic acid resins, liquid-type polybutadiene, and cumarone resins; natural or synthetic rubber binders such as ethylenepropylene copolymer rubbers, polybutadiene rubbers, styrene-butadiene rubbers, and acrylonitrile-butadiene copolymer rubbers; natural resin binders such as shellac, rosin (pine resin), ester gum, cured rosin, decolorized shellac, and white shellac; and thermoplastic or thermosetting polymer binders such as cellulose nitrate, cellulose acetate butylate, cellulose acetate, ethyl cellulose, hydroxypropylmethyl cellulose, and hydroxyethyl cellulose. These binder resins may be used alone, or two or more of these binder resins may also be used in combination. In these binder resins, acrylic resins may be preferred, and in particular, (meth)acrylic copolymers may be more preferred, in that their glass transition temperatures (Tgs) and their degrees of hydrophobicity can easily be designed by controlling the relative proportions of monomers contained therein. Incidentally, the binder resin may be preferred not to be crosslinked.

The type of the binder resin is not particularly limited, examples of which may include binder resins of the solvent-soluble type, the water-soluble type, the emulsion type, and the dispersion type (using an arbitrary solvent such as water or organic solvents). When the binder resin is of such a type, the phrase "the binder resin has a glass transition temperature (Tg) in a range of from −85° C. to −10° C. as calculated by FOX formula" means that a copolymer forming the resin content (i.e., the solid content) of the binder resin has a glass transition temperature (Tg) in a range of from −85° C. to −10° C. as calculated by FOX formula.

In these types, examples of the water-soluble type binder may include water-soluble alkyd resins, water-soluble acryl-modified alkyd resins, water-soluble oil-free alkyd resins (water-soluble polyester resins), water-soluble acrylic resins, water-soluble epoxy ester resins, and water-soluble melamine resins. Examples of the emulsion type binder may include alkyl (meth)acrylate copolymer dispersions, vinyl acetate resin emulsions, vinyl acetate copolymer resin emulsions, ethylene-vinyl acetate copolymer resin emulsions, acrylic acid ester (co)polymer resin emulsions, styrene-acrylic acid ester (co)polymer resin emulsions, epoxy resin emulsions, urethane resin emulsions, acrylic-silicone emulsions, and fluorocarbon polymer emulsions. In these types, examples of the emulsion type binder may be preferred.

The glass transition temperature (Tg) of a binder resin as calculated by FOX formula may usually have a lower limit of −85° C. and it may usually have an upper limit of −10° C., preferably −30° C., and more preferably −60° C. In this connection, "FOX formula" means the one for calculating the glass transition temperature (Tg) of a copolymer, based on the glass transition temperatures (Tgs) of homopolymers of the respective monomers forming the copolymer. The details of FOX formula are described in Bulletin of the American Physical Society, Series 2), Vol. 1, No. 3, p. 123 (1956). Specifically, the glass transition temperature (Tg) as calculated by FOX formula means the value obtained by the conversion, from the absolute temperature (K) to the centigrade temperature (° C.), of the glass transition temperature (Tg) calculated by the following formula:

$$1/Tg = \Sigma(W_i/Tg_i)$$

where Tg is the glass transition temperature (unit: Kelvin) of a binder resin (or a copolymer), $W_i$ is the mass fraction of "monomer i", and $Tg_i$ is the glass transition temperature (unit: Kelvin) of a resin (or a homopolymer) formed from "monomer i".

As the glass transition temperatures (Tgs) of homopolymers of various monomers, which can serve as the basis for evaluating the glass transition temperature (Tg) of a binder resin by FOX formula, there can be employed, for example, numerical values described in "Tosou to Toryo (note: Coating and Paint in English)" (published by Toryo Shuppansha, Vol. 10 (No. 358), 1982).

Specifically, for example, when the binder resin is a (meth) acrylic copolymer, examples of the monomer which can be used (Tg: temperature in the parentheses denotes the glass transition temperature of its homopolymer (unit: Kelvin)) may include, although they are not limited to, acrylic acid (Tg: 360.2K), methyl acrylate (Tg: 279.2K), ethyl acrylate (Tg: 249.2K), n-butyl acrylate (Tg: 218.2K), 2-ethylhexyl acrylate (Tg: 188.2K), lauryl acrylate (Tg: 270.2K), 2-hydroxyethyl acrylate (Tg: 258.2K), 2-hydroxypropyl acrylate (Tg: 266.2K), methacrylic acid (Tg: 417.2K), methyl methacrylate (Tg: 378.2K), ethyl methacrylate (Tg: 338.2K), n-butyl methacrylate (Tg: 293.2 K), isobutyl methacrylate (Tg: 326.2K), 2-ethylhexyl methacrylate (Tg: 263.2K), lauryl methacrylate (Tg: 208.2K), dimethylaminoethyl methacrylate (Tg: 291.2K), 2-hydroxyethyl methacrylate (328.2K), and 2-hydroxypropyl methacrylate (Tg: 299.2K). In these monomers, it may be more preferred to use monomers, of which homopolymers have low glass transition temperatures (Tgs).

The glass transition temperature (Tg) of a binder resin as calculated by FOX formula can be controlled in a range of from −85° C. to −10° C. by appropriately adjusting the relative proportions of monomers contained therein. The method for this is well known and can easily be carried out by a person of ordinary skill in the art. For example, when the binder resin is a (meth)acrylic copolymer, it can be prepared by copolymerizing two or more (meth)acrylic monomers using any of the heretofore known methods (e.g., an emulsion polymerization method). The glass transition temperature (Tg) of the (meth)acrylic copolymer obtained as calculated by FOX formula can be controlled in a range of from −85° C. to −10° C. by appropriately adjusting the mass fractions of the respective monomers when the total mass of the monomers used is set to be 1.

According to the present inventors' studies, it has been found that if the binder resin has a lower glass transition temperature (Tg) as calculated by FOX formula, there can be obtained electrophoretic display devices having higher adhesiveness between the base material sheets (e.g., electrode films) and the microcapsule layer and having highly improved contrast. This seems to be because, when another base material sheet (e.g., an opposite electrode film) is laminated on the side of the microcapsule layer, the microcapsules and the binder resin may migrate, so that the microcapsules are densely filled and arranged between the opposite base material sheets (e.g., electrode films) and therefore there becomes decreased gaps (low-dielectric portions) between the base material sheets (e.g., electrode films) and the microcapsules, whereby an electric field can uniformly be applied to the microcapsules.

In addition, in the solid content of a binder resin to be incorporated into the coating composition of the present invention, a residual monomer concentration is usually 500 ppm or lower. The lower limit of the residual monomer concentration is not particularly limited, but may preferably be 100 ppm, more preferably 50 ppm, still more preferably 10 ppm, and most preferably 0 ppm. The residual monomer concentration as used herein means the total concentration (by mass) of all monomers remaining in the solid content of a binder resin, and can be measured by gas chromatography using the method described below in Examples.

To suppress the residual monomer concentration in the solid content of a binder resin to 500 ppm or lower, there may be controlled the aging time after dropwise addition of monomers when the binder resin is synthesized. The aging time after dropwise addition of monomers to reduce the residual monomer concentration to 500 ppm or lower may preferably have a lower limit of 3 hours, more preferably 5 hours, and it may preferably have an upper limit of 20 hours, more preferably 10 hours. Alternatively, for example, it may also be checked that the residual monomer concentration is 500 ppm or lower by collecting a sample from the reaction mixture as needed during the aging and then measuring the sample by gas chromatography.

Further, the weight-average molecular weight of a binder resin may preferably have a lower limit of 300,000, more preferably 350,000, and it may preferably have an upper limit of 500,000, more preferably 450,000. If a binder resin has a weight-average molecular weight of lower than 300,000, the adhesiveness between the base material sheets (e.g., electrode films) and the microcapsules layer may be decreased, and when an electrophoretic display device is produced, the electrophoretic display device may have decreased contrast. To the contrary, if a binder resin has a weight-average molecular weight of higher than 500,000, the microcapsules and the binder resin may hardly migrate at the time of lamination, and the microcapsules cannot be densely filled and arranged between the opposite base material sheets (e.g., electrode films), so that, when an electrophoretic display device is produced, the electrophoretic display device may have decreased contrast. The weight-average molecular weight of a binder resin as used herein means the weight-average molecular weight of a copolymer forming the resin content (i.e., the solid content) of the binder resin. In this connection, the weight-average molecular weight of a binder resin can be measured in terms of polystyrene conversion by ordinary gel permeation chromatography (GPC).

The amount of a binder resin to be incorporated into the coating composition of the present invention may preferably have a lower limit of 10% by mass, more preferably 15% by mass, and still more preferably 20% by mass, when the total mass of the solid content of a microcapsule dispersion and the solid content of the binder resin is set to be 100% by mass, and it may preferably have an upper limit of 50% by mass, more preferably 40% by mass, and still more preferably 30% by mass, when the total mass of the solid content of a microcapsule dispersion and the solid content of the binder resin is set to be 100% by mass. If the amount of a binder resin to be incorporated is smaller than 10% by mass, the adhesiveness between the base material sheets (e.g., electrode films) and the microcapsule layer may be decreased. To the contrary, if the amount of a binder resin to be incorporated is greater than 50% by mass, it may becomes difficult that the microcapsules are densely filled and arranged between the opposite base material sheets (e.g., electrode films), so that, when an electrophoretic display device is produced, the electrophoretic display device may have decreased contrast.

As the binder resin to be incorporated into the coating composition of the present invention, there is used a binder resin having a glass transition temperature (Tg) in a range of from −85° C. to −10° C. as calculated by FOX formula, and at the same time, a residual monomer concentration is suppressed to 500 ppm or lower in the solid content of the binder resin. Thus, electrophoretic display devices finally obtained can have high adhesiveness between the base material sheets (e.g., electrode films) and the microcapsule layer and have improved contrast.

<Microcapsules>

The microcapsules to be incorporated into the coating composition of the present invention are microcapsules each enclosing a dispersion containing electrophoretic particles and a solvent in a shell. The microcapsules such as these are not particularly limited, but any of the heretofore known microcapsules for electrophoretic display devices can be used. However, in general, binder resins having low glass transition temperatures (Tgs) are highly hydrophobic, and therefore, for example, if microcapsules each having a shell made of gelatine and gum arabic are used, there is a possibility that a solvent contained in the contents of the shell may leach out (bleed), and these microcapsules are not preferred. For this reason, it may be preferred to use microcapsules each having a shell from which a solvent contained in the contents of the shell is difficult to leach out.

Examples of the microcapsules such as these may include double-layer microcapsules in which the shell comprises an inner shell made of a mercapto group-containing amino resin and an outer shell made of an epoxy resin. In such microcapsules for electrophoretic display devices, the outer shell may preferably be made of a melamine-crosslinked epoxy resin. These double-layer microcapsules have improved capsule strength and cause no leaching out (bleeding) of a solvent contained in the contents of the shell because the amino resin forming the inner shell has high impermeability, the epoxy resin forming the outer shell has excellent heat resistant and mechanical properties, and the amino resin forming the inner shell and the epoxy resin forming the outer shell are bonded firmly through mercapto groups.

In the double-layer microcapsules as described above, the inner shell can be formed by dispersing a dispersion containing electrophoretic particles and a solvent in a water-based medium, and subsequently carrying out a condensation reaction using a preliminary condensation product obtained by the reaction of at least one compound selected from the group consisting of urea, thiourea, melamine, benzoguanamine, acetoguanamine, and cyclohexylguanamine with formaldehyde in the presence of a compound having a mercapto group(s) and either a carboxyl group(s) or a sulfo group(s). In this connection, it can be analyzed by a Fourier transform infrared spectroscopy (FTIR) that the amino resin forming the inner shell has mercapto groups.

In the double-layer microcapsules as described above, the outer shell can be formed by dispersing microcapsules each enclosing a dispersion in the inner shell in a water-based medium, and subsequently adding a compound having an epoxy group(s) thereto. In this connection, when the outer shell is formed, it may be preferred to cause a reaction of the compound having an epoxy group(s) with a crosslinking agent and/or add an epoxy-melamine condensation product in addition to the compound having an epoxy group(s) since the strength and impermeability of the outer shell are improved, so that the microcapsules are provided with higher performance.

The thickness of the shells of the microcapsules (in the case of double-layer microcapsules, the total thickness of the inner shell and the outer shell) is not particularly limited, but it may preferably have a lower limit of 0.1 μm, for example, in a swollen state, and it may preferably have an upper limit of 5 μm, more preferably 4 μm, and still more preferably 3 μm, for example, in a swollen state. If the thickness of the shells of the microcapsules is thinner than 0.1 μm, it may become impossible to obtain sufficient capsule strength. To the contrary, if the thickness of the shells of the microcapsules is thicker than 5 μm, transparency is decreased, so that when the microcapsules are used for electrophoretic display devices, it may result in a contrast decrease; and the flexibility of the microcapsules is decreased, and therefore, when a sheet for electrophoretic display devices is produced, the adhesiveness to an electrode film may become insufficient.

The microcapsules have flexibility to a certain extent, and since their shape can be changed by external pressure, the shape is not particularly limited, but it may preferably be particulate, e.g., truly spherical, when there is no external pressure.

The particle diameter of the microcapsules is not particularly limited, but it may preferably have a lower limit of 5 μm, more preferably 10 μm, and still more preferably 15 μm, and it may preferably have an upper limit of 300 μm, more preferably 200 μm, and still more preferably 150 μm. If the particle diameter of the microcapsules is smaller than 5 μm, it may become impossible to obtain sufficient display density in a display part when an electrophoretic display device is produced. To the contrary, if the particle diameter of the microcapsules is greater than 300 μm, the strength of the microcapsules may be decreased, and the electrophoretic properties of electrophoretic particles in a dispersion enclosed in the microcapsules cannot sufficiently be exhibited, and accordingly, the driving voltage for display may be increased, when an electrophoretic display device is produced. In this connection, the particle diameter of the microcapsules means their volume-average particle diameter as measured by a laser scattering particle size distribution analyzer.

The variation coefficient (i.e., the narrowness of particle size distribution) of the particle diameter of the microcapsules is not particularly limited, but it may preferably be 30% or lower, more preferably 25% or lower, and still more preferably 20% or lower. The lower limit of the variation coefficient of the particle diameter of the microcapsules is not particularly limited, but it may most preferably be 0%. If the variation coefficient of the particle diameter of the microcapsules is higher than 30%, the microcapsules having an effective particle diameter may be decreased, and therefore, a great number of the microcapsules may have to be used in some cases.

The particle diameter and its variation coefficient of the microcapsules are considerably dependent on the particle diameter and particle size distribution of a dispersion obtained by dispersing the microcapsules in a water-based medium when the microcapsules are produced. Therefore, it is made possible to obtain the microcapsules having a desired particle diameter and its variation coefficient by appropriately adjusting the dispersing conditions of the dispersion.

The concentration of the microcapsules in the coating composition is not particularly limited, but it may preferably have a lower limit of 30% by mass, when the total mass of the composition is set to be 100% by mass, and it may preferably have an upper limit of 70% by mass, more preferably 60% by mass, and still more preferably 55% by mass, when the total mass of the composition is set to be 100% by mass. If the concentration of the microcapsules is within the above range, for example, it makes possible to obtain a display sheet in which the microcapsules are arranged densely in one layer on a base material sheet (e.g., an electrode film), and when such a display sheet is used for an electrophoretic display device, excellent product quality (display quality) can be exhibited.

(Electrophoretic Particles)

In general, there are, as a method for electrophoretic display, a display method on the basis of a contrast between the color of a solvent and the color of electrophoretic particles in a dispersion, and a display method on the basis of a contrast between the colors of at least two types of electrophoretic particles in a dispersion.

The electrophoretic particles to be used for the dispersion may be solid particles having electrophoretic properties, that is, colored particles showing positive or negative polarity in the dispersion and are not particularly limited, but, for example, pigment particles may be employed. Alternatively, polymer particles colored with dyes or polymer particles containing pigments may also be used. These solid particles may be used alone, or two or more of these solid particles may also be used in combination. In these solid particles, pigment particles may be preferred. In this connection, when solid particles having no electrophoretic properties in the dispersion are used as the electrophoretic particles, the electrophoretic properties are provided by any of the heretofore known methods. Alternatively, solid particles having electrophoretic properties in the dispersion and solid particles having no electrophoretic properties in the dispersion may also be used in combination.

The pigment particles to be used as the electrophoretic particles are not particularly limited, but they may be particles of, as white types, inorganic pigments such as titanium dioxide, barium sulfate, and zinc oxide; as yellow types, inorganic pigments such as yellow iron oxide, cadmium yellow, titanium yellow, and chrome yellow, and organic pigments, e.g., insoluble azo compounds such as fast yellow, fused azo compounds such as chromophthal yellow, azo complex salts such as benzimidazolone azo yellow, fused polycyclic compounds such as flavans yellow, hansa yellow, naphthol yellow, nitro compounds, and pigment yellow; as orange types, inorganic pigments such as molybdate orange, and organic pigments, e.g., azo complex salts such as benzimidazolone azo orange and fused polycyclic compounds such as perynone orange; as red types, inorganic pigments such as colcothar and cadmium red, and organic pigments, e.g., dye lakes such as madder lake, soluble azo compounds such as lake red, insoluble azo compounds such as naphthol red, fused azo compounds such as chromophthal scarlet, fused polycyclic compounds such as thioindigo Bordeaux, quinacridone pigments such as Cinquasia red Y and hostarparm red, and azo type pigments such as permanent red and fast slow red; as violet types, inorganic pigments such as manganese violet, and organic pigments, e.g., dye lakes such as Rhodamine lake, and fused polycyclic compounds such as dioxazine violet; as blue types, inorganic pigments such as Prussian blue, ultramarine, cobalt blue, and cerulean blue, and organic pigments, e.g., phthalocyanines such as phthalocyanine blue, indanthrenes such as indanthrene blue, and alkali blue; as green types, inorganic pigments such as emerald green, chrome green, chromium oxide, and viridian, and organic pigments, e.g., azo complex salts such as nickel azo yellow, nitroso compounds such as pigment green, and naphthol green, and phthalocyanines such as phthalocyanine green; as black types, inorganic pigments such as carbon black, titanium black, and iron black, and organic pigments such as aniline black. These pigment particles may be used alone, or two or more of these pigment particles may also be used in combination. In these pigment particles, there may be preferred white type pigment particles such as titanium dioxide and black type pigment particles such as carbon black and titanium black.

When fine particles of titanium dioxide are used, their type is not particularly limited, and so far as they are widely used as white type pigments, the particles may be either the rutile type or the anatase type, but taking into consideration the color fading of a coloring agent due to the photocatalyst activity of titanium dioxide, the rutile type which has lower photocatalyst activity may be preferred, and further, in order to lower the photocatalyst activity, it may be more preferred to use titanium dioxide which has been subjected to $SiO_2$ treatment, $Al_2O_3$ treatment, $SiO_2$—$Al_2O_3$ treatment, or ZnO—$Al_2O_3$ treatment.

When polymer particles are used as the electrophoretic particles, their component polymer is not particularly limited, but examples of the polymer may include polyolefin type polymers, poly(halogenated polyolefin) type polymers, polyester type polymers, polyurethane type polymers, polystyrene type polymers, acrylic type polymers, epoxy type polymers, melamine type polymers, and urea type polymers. The term "polymer(s)" as used herein may include homopolymers and copolymers obtained by copolymerization of a monomer(s) with a small amount of a copolymerizable monomer(s). These polymer particles may be used alone, or two or more of these polymer particles may also be used in combination. Dyes for coloring these polymer particles are not particularly limited, but examples of the dyes may include dyes recited below as the dye for coloring a solvent. The pigment to be added to these polymer particles is not particularly limited, but examples of the pigment may include pigments recited above as the pigment to be used for the electrophoretic particles.

The concentration of electrophoretic particles in a dispersion (i.e., percent (%) by mass of the electrophoretic particles, relative to the mass of the dispersion) may preferably have a lower limit of 5% by mass, more preferably 7% by mass, and still more preferably 10% by mass, and it may preferably have an upper limit of 60% by mass, more preferably 55% by mass, and still more preferably 50% by mass. If the concentration of electrophoretic particles is lower than 5% by mass, no sufficient chromaticity can be obtained, and contrast may be decreased to result in the unclearness of display. To the contrary, if the concentration of electrophoretic particles is higher than 60% by mass, the viscosity of a dispersion may be increased, so that dispersion treatment may become difficult, and the electrophoretic particles may be aggregated in a part to which voltage is applied for display, and it may lead to a decrease of contrast and a decrease of response time (display responsiveness) of the electrophoretic particles.

The particle diameter of electrophoretic particles is not particularly limited, but it may preferably have a lower limit of 0.1 µm and it more preferably have an upper limit of 5 µm, more preferably 4 µm, and still more preferably 3 µm. If the particle diameter of electrophoretic particle is smaller than 0.1 µm, no sufficient chromaticity can be obtained, and when the electrophoretic particles are used for an electrophoretic display device, contrast may be decreased to result in the unclearness of display. To the contrary, if the particle diameter of electrophoretic particles is greater than 5 µm, it is needed to heighten the coloration degree of the electrophoretic particles themselves beyond necessity, and accordingly, the use amount of pigments may be increased, and when the electrophoretic particles are used for an electrophoretic display device, it may become difficult for the electrophoretic particles to rapidly move in a part to which voltage is applied for display, so that their response time (display responsiveness) may be decreased. In this connection, the particle diameter of electrophoretic particles means their volume-average particle diameter measured by a dynamic light scattering particle size analyzer.

The electrophoretic particles may be dispersed as they are in a solvent, but after the surfaces of electrophoretic particles are treated by the reaction with a coupling agent, or by polymer grafting treatment, or by coating with a polymer, the electrophoretic particles may be dispersed in a solvent. When the surface treatment is carried out, the electrophoretic particles may preferably be pigment particles surface-treated with a coupling agent or a polymer. In the present invention, surface-treated electrophoretic particles may be referred simply to as electrophoretic particles.

(Solvent)

The solvent to be used for the dispersion is not particularly limited, but may be any of the solvent which have heretofore been widely used for a dispersion for electrophoretic display devices, and more specifically, there may be used those which are substantially insoluble in water (hydrophobic) and cause no interaction with the shells of the microcapsules to an extent that the functions of the microcapsules are not inhibited, and for example, highly insulating organic solvents may be preferred.

Examples of the highly insulating organic solvents may include aromatic hydrocarbons, e.g. benzene type hydrocarbons such as benzene, toluene, o-xylene, m-xylene, p-xylene, mixed xylene, ethylbenzene, hexylbenzene, dodecylbenzene, and phenylxylylethane; aliphatic hydrocarbons, e.g. paraffin type hydrocarbons such as hexane and decane, isoparaffin type hydrocarbons such as Isopar (registered trademark) series (available from ExxonMobil Chemical), olefin type hydrocarbons such as 1-octene and 1-decene, and naphthene type hydrocarbons such as cyclohexane and decalin; petroleum- and coal-derived hydrocarbon mixtures such as kerosene, petroleum ethers, petroleum benzin, ligroin, industrial gasoline, coal tar naphtha, petroleum naphtha, and solvent naphtha; halogenated hydrocarbons such as dichloromethane, chloroform, carbon tetrachloride, 1,2-dichloroethane, 1,1,1-trichloroethane, 1,1,2,2-tetrachloroethane, trichlorofluoroethane, tetrabromoethane, dibromotetrafluoroethane, tetrafluorodiiodoethane, 1,2-dichloroethylene, trichloroethylene, tetrachloroethylene, trichlorofluoroethylene, chlorobutane, chlorocyclohexane, chlorobenzene, o-dichlorobenzene, bromobenzene, iodomethane, diiodomethane, and iodoform; silicone oils such as dimethylsilicone oil and methylphenylsilicone oil; and fluorocarbon type solvents such as hydrofluoro ethers. These organic solvents may be used alone, or two or more of these organic solvents may also be used in combination. In these organic solvents, long-chain alkylbenzenes such as hexylbenzene and dodecylbenzene, phenylxylylethane, Isoper series (available from ExxonMobil Chemical), and dimethylsilicone oil may be preferred because they have high boiling points and high ignition points and they have almost no toxicity.

When a solvent is colored, it may be preferred to carry out colorization to an extent that sufficient contrast can be obtained to the color of electrophoretic particles (e.g., to white in the case of fine particles of titanium dioxide).

When a solvent is colored, a dye to be used for the colorization is not particularly limited, but oil-soluble dyes may be preferred, and particularly in terms of usability, azo dyes and anthraquinone dyes may be preferred. Specific examples of the dye may include, as yellow type dyes, azo compounds such as OIL YELLOW 3G (available from Orient Chemical Industries, Ltd.); as orange type dyes, azo compounds such as FAST ORANGE G (available from BASF AG); as blue type dyes, anthraquinones such as MACROLEX BLUE RR (available from BAYER AG); as green type dyes, anthraquinones such as SUMIPLAST GREEN G (available from Sumitomo Chemical Co., Ltd.); as brown type dyes, azo compounds such as OIL BROWN GR (available from Orient Chemical Industries, Ltd.); as red type dyes, azo compounds such as OIL RED 5303 (available from Arimoto Chemical Co., Ltd.) and OIL RED 5B (available from Orient Chemical Industries, Ltd.); as violet type dyes, anthraquinones such as OIL VIOLET #730 (available from Orient Chemical Industries, Ltd.); and as black type dyes, azo compounds such as SUDAN BLACK X60 (available from BASF AG) and mixtures of anthraquinone type MACROLEX BLUE FR (available from BAYER AG) and azo type OIL RED XO (available from Kanto Chemical Co., Inc.). These dyes may be used alone, or two or more of these dyes may also be used in combination.

The dispersion may contain, if necessary, besides electrophoretic particles and a solvent, a dye(s), a dispersant(s), an electric charge controlling agent(s), a viscosity modifier(s), and the like. Their addition amounts are not particularly limited, but may appropriately be adjusted to an extent that they neither affect the electrophoretic particles nor inhibit the functions of the electrophoretic particles.

<Production of Microcapsules>

The process for producing the microcapsules as described above, each enclosing a dispersion containing electrophoretic particles and a solvent in a shell with a double layer structure composed of an inner shell made of a mercapto group-containing amino resin and an outer shell made of an epoxy resin, comprises dispersing a dispersion containing electrophoretic particles and a solvent as a core substance in a water-based medium; subsequently carrying out a condensation reaction using a preliminary condensation product obtained by the reaction of at least one compound selected from the group consisting of urea, thiourea, melamine, benzoguanamine, acetoguanamine, and cyclohexylguanamine with formaldehyde, in the presence of a compound having a mercapto group(s) and either a carboxyl group(s) or a sulfo group(s), thereby forming an inner shell made of a mercapto group-containing amino resin on the surface of the core substance; dispersing microcapsules each enclosing the core substance in the inner shell in a water-based medium; and successively adding an epoxy group-containing compound thereto, thereby forming an outer shell made of an epoxy resin on the outer surface of the inner shell.

The following will describe in detail such a process for producing the microcapsules along the respective steps.

(Dispersing of Core Substance)

First, using a dispersion containing electrophoretic particles and a solvent as a core substance, the core substance is dispersed in a water-based medium. The water-based medium is not particularly limited, but there can be used, for example, water or a mixed solvent of water with a hydrophilic organic solvent. When water and a hydrophilic organic solvent are used in combination, the addition amount of water may preferably have a lower limit of 70% by mass, more preferably 75% by mass, and still more preferably 80% by mass, and it may preferably have an upper limit of 95% by mass.

The hydrophilic organic solvent is not particularly limited, but examples of the hydrophilic organic solvent may include alcohols such as methanol, ethanol, n-propyl alcohol, isopropyl alcohol, and allyl alcohol; glycols such as ethylene glycol, propylene glycol, butylene glycol, pentanediol, hexanediol, heptanediol, and dipropylene glycol; ketones such as acetone, methyl ethyl ketone, methyl propyl ketone, and methyl isobutyl ketone; esters such as methyl formate, ethyl formate, methyl acetate, and methyl acetoacetate; and ethers such as diethylene glycol monomethyl ether, diethylene glycol monoethyl ether, diethylene glycol dimethyl ether, ethylene glycol monomethyl ether, ethylene glycol monoethyl ether, and dipropylene glycol monomethyl ether. These hydrophilic organic solvents may be used alone, or two or more of these hydrophilic organic solvents may also be used in combination.

The water-based medium may be used in combination with another solvent, besides water and a hydrophilic organic solvent. Examples of another solvent may include hexane, cyclopentane, pentane, isopentane, octane, benzene, toluene, xylene, ethylbenzene, aminylsqualene, petroleum ethers, terpene, castor oil, soybean oil, paraffin, and kerosene. When another solvent is used in combination, its use amount may preferably be 30% by mass or lower, more preferably 25% by mass or lower, and still more preferably 20% by mass or lower, relative to the water-based medium containing water and a hydrophilic organic solvent.

The amount of a core substance to be dispersed in a water-based medium is not particularly limited, but it may preferably have a lower limit of 5 parts by mass, more preferably 8 parts by mass, and still more preferably 10 parts by mass, relative to 100 parts by mass of the water-based medium, and it may preferably have an upper limit of 70 parts by mass, more preferably 65 parts by mass, and still more preferably 60 parts by mass, relative to 100 parts by mass of the water-based medium. If the amount for dispersion is lower than 5 parts by mass, the concentration of a core substance is low, so that it may take a long time to form capsule shells and it may become impossible to produce the desired microcapsules, and the microcapsules may have a wide particle size distribution to decrease production efficiency. To the contrary, if the amount for dispersion is higher than 70 parts by mass, a core substance is aggregated and the water-based medium is suspended in the core substance to make it impossible to produce the microcapsules.

When the core substance is dispersed in a water-based medium, a dispersant may be used, if necessary. The dispersant is not particularly limited, but examples of the dispersant may include water-soluble polymers (e.g., polyvinyl alcohol (PVA), carboxymethyl cellulose (CMC), gelatin, and gum arabic) and surfactants (e.g., anionic surfactants, cationic surfactants, amphoteric surfactants, and nonionic surfactants). These dispersants may be used alone, or two or more of these dispersants may also be used in combination. The addition amount of any of these dispersants is not particularly limited, so long as it does not inhibit inner shell formation, and it may appropriately be adjusted.

(Preparation of Preliminary Condensation Product)

Then, the preliminary condensation product is prepared by causing a reaction of at least one compound selected from the group consisting of urea, thiourea, melamine, benzoguanamine, acetoguanamine, and cyclohexylguanamine (hereinafter sometimes referred to as the "amino compound") with formaldehyde.

The preliminary condensation product obtained by the reaction of the amino compound with formaldehyde is a compound to be a precursor of an "amino resin" (i.e., urea resin, melamine resin, or guanamine resin). Using the specific preliminary condensation product, the inner shell made of an amino resin can be formed, and mercapto groups can be introduced into the amino resin produced from the preliminary condensation product by causing the reaction in the presence of a compound having a mercapto group(s) and either a carboxy or sulfo group(s).

With respect to the preliminary condensation product, (1) when at least one of urea and thiourea (hereinafter sometimes referred to as the "urea compound") is reacted with formaldehyde, there can be obtained a preliminary condensation product giving a urea resin; (2) when melamine is reacted with formaldehyde, there can be obtained a preliminary condensation product giving a melamine resin; and (3) when at least one of benzoguanamine, acetoguanamine, and cyclohexylguanamine (hereinafter sometimes referred to as the "guanamine compound") is reacted with formaldehyde, there can be obtained a preliminary condensation product giving a guanamine resin. In addition, (4) when at least two of the urea compound, melamine, and the guanamine compound are reacted with formaldehyde, there can be obtained a preliminary condensation product giving a resin containing at least two types of urea resin, mela-mine resin, and guanamine resin. These preliminary condensation products (1) to (4) may be used alone, or two or more of these preliminary condensation products (1) to (4) may also be used in combination.

In general, the reaction of the amino compound with formaldehyde is carried out using water as a solvent. Therefore, the reaction may be carried out, for example, by a method of mixing the amino compound with an aqueous formaldehyde solution and carrying out the reaction, or by a method of preparing an aqueous formaldehyde solution by the addition of water to trioxane or p-formaldehyde, mixing the amino compound with the aqueous formaldehyde solution thus obtained, and carrying out the reaction. From economical points of view, e.g., in terms of no need to prepare an aqueous formaldehyde solution and the availability of an aqueous formaldehyde solution, there may be preferred a method of mixing the amino compound with an aqueous formaldehyde solution and carrying out the reaction. In addition, when the amino compound is mixed with an aqueous formaldehyde solution, either of adding the amino compound to the aqueous formaldehyde solution or adding the aqueous formaldehyde solution to the amino compound may be possible. The condensation reaction may preferably be carried out under stirring using any of the heretofore known stirring apparatuses.

The amino compound may preferably be urea, melamine, and benzoguanamine, more preferably melamine, a combination of melamine and urea, and a combination of melamine and benzoguanamine.

As the amino compound, another amino compound may be used, besides the above amino compound. Examples of another amino compound may include capriguanamine, amerine, ameride, ethylene urea, propylene urea, and acetylene urea. When another amino compound is used, amino compounds including another amino compound are used as starting materials for the preliminary condensation product.

With respect to the reaction for obtaining a preliminary condensation product, the addition amounts of the amino compound and formaldehyde are not particularly limited, but they may preferably be, by the mole ratio of amino compound/formaldehyde, from 1/0.5 to 1/10, more preferably from 1/1 to 1/8, and still more preferably from 1/1 to 1/6. If the mole ratio of amino compound/formaldehyde is lower than 1/10, the amount of unreacted formaldehyde may be increased, and therefore, the reaction efficiency may be decreased. To the contrary, if the mole ratio of amino compound/formaldehyde is higher than 1/0.5, the amount of unreacted amino compound may be increased, and therefore, the reaction efficiency may be decreased. In this connection, if water is used as the solvent for the reaction, the addition amounts of the amino compound and formaldehyde, relative to the solvent, that is, the concentrations of the amino compound and formaldehyde at the time of feed may be more desirable to be higher, so long as there is no particular obstacle in the reaction.

The reaction temperature for carrying out the reaction for obtaining a preliminary condensation product is not particularly limited, but it may preferably have a lower limit of 55° C., more preferably 60° C., and still more preferably 65° C., and it may preferably have an upper limit of 85° C., more preferably 80° C., and still more preferably 75° C. When the end point of the reaction is confirmed, the reaction may be finished by an operation such as cooling of a reaction solution to room temperature (e.g., from 25° C. to 30° C.). Thus, the reaction solution containing a preliminary condensation product can be obtained. The reaction time is not particularly limited, but it may appropriately be set in accordance with the feed amounts.

(Formation of Inner Shell)

Then, a condensation reaction is carried out using a preliminary condensation product in a water-based medium containing a core substance dispersed therein in the presence of a compound having a mercapto group(s) (—SH) and either a carboxyl group(s) (—COOH) or a sulfo group(s) (—SO$_3$H) (hereinafter sometimes referred to as the "thiol compound") to form an inner shell made of a mercapto group-containing amino resin on the surface of the core substance. This operation gives microcapsules each enclosing a dispersion containing electrophoretic particles and a solvent in an inner shell made of a mercapto group-containing amino resin.

The addition amount of a preliminary condensation product is not particularly limited, but it may preferably have a lower limit of 0.5 parts by mass, relative to 1 part by mass of a core substance, and it may preferably have an upper limit of 10 parts by mass, more preferably 5 parts by mass, and still more preferably 3 parts by mass, relative to 1 part by mass of a core substance. The thickness of an inner shell can easily be controlled by adjusting the addition amount of a preliminary condensation product. If the addition amount of a preliminary condensation product is lower than 0.5 parts by mass, it may become impossible to form a sufficient amount of an inner shell or the thickness of an inner shell may become thinner, so that the strength and impermeability of the inner shell may be lowered. To the contrary, if the addition amount of a preliminary condensation product is higher than 10 parts by mass, the thickness of an inner shell may become thicker, so that the flexibility and transparency of the inner shell may be lowered.

The method of adding a preliminary condensation product to a water-based medium is not particularly limited, but either of collective addition or successive addition (continuous addition and/or intermittent addition) may be employed. The addition of a preliminary condensation product may be preferred to be carried out under stirring using any of the heretofore known stirring apparatuses.

The thiol compound to be used in the condensation reaction is not particularly limited, but examples of the thiol compound may include cysteine (2-amino-3-mercaptopropionic acid), mercaptoacetic acid, mercaptopropionic acid, mercaptobenzoic acid, mercaptosuccinic acid, mercaptoethanesulfonic acid, mercaptopropanesulfonic acid, their alkali metal salts, their alkaline earth metal salts, and their ammonium salts. These thiol compounds may be used alone, or two or more of these thiol compounds may also be used in combination. In these thiol compounds, L-cysteine may be preferred from economical points of view, e.g., in terms of availability.

The addition amount of a thiol compound is not particularly limited, but it may preferably have a lower limit of 1 part by mass, relative to 100 parts by mass of a preliminary condensation product, and it may preferably have an upper limit of 20 parts by mass, more preferably 10 parts by mass, and still more preferably 5 parts by mass, relative to 100 parts by mass of a preliminary condensation product. If the addition amount of a thiol compound is lower than 1 part by mass, since the amount of mercapto groups to be introduced into the amino resin may be low, firm bonds with an epoxy resin forming an outer shell cannot be formed in some cases. To the contrary, if the addition amount of a thiol compound is higher than 20 parts by mass, the strength and impermeability of an inner shell may be lowered.

The method of adding a thiol compound to a water-based medium is not particularly limited, but it may be preferred to be carried out by adding a preliminary condensation product to a water-based medium containing a core substance dispersed therein, sufficiently stirring the mixture thus obtained, and then dropwise adding a thiol compound in form of an aqueous solution. The condensation reaction may be preferred to be carried out under stirring using any of the heretofore known stirring apparatuses.

In the production process as described herein, an inner shell is formed on the surface of a core substance by carrying out the condensation reaction of a preliminary condensation product in the presence of a thiol compound in a water-based medium containing the core substance dispersed therein. Specifically, while the amino group(s) of a preliminary condensation product and the carboxyl group(s) or sulfo group(s) of a thiol compound are reacted with each other, the condensation reaction of the preliminary condensation product is carried out to deposit a mercapto group-containing amino resin on the surface of a core substance to form an inner shell.

The reaction temperature for carrying out the condensation reaction is not particularly limited, but it may preferably have a lower limit of 25° C., more preferably 30° C., and still more preferably 35° C., and it may preferably have an upper limit of 80° C., more preferably 70° C., and still more preferably 60° C. The reaction time is not particularly limited, but it may appropriately be set in accordance with the feed amounts.

After the condensation reaction is carried out, an aging period may be provided. The temperature for aging is not particularly limited, but it may preferably be a temperature equal to or slightly higher than the reaction temperature for carrying out the condensation reaction. The aging period is not particularly limited, but it may preferably have a lower limit of 0.5 hours, more preferably 1 hour, and it may preferably have an upper limit of 5 hours, more preferably 3 hours.

After an inner shell is formed, the microcapsules thus obtained may be separated from the water-based medium by any of the heretofore known methods, for example, suction filtration or spontaneous filtration, if necessary, but since an amino resin forming an inner shell is very fragile and may possibly be broken or damaged by weak impact or pressure, it may be preferred to subject the microcapsules to the next process without separating the microcapsules from the water-based medium.

(Classifying and Washing of Microcapsules)

The microcapsules obtained at the step of forming an inner shell may be preferred to be classified to obtain microcapsules in a narrow particle size distribution and/or may be preferred to be washed to remove impurities to improve product quality.

The classification of microcapsules may be carried out in such a manner that the microcapsules have a desired particle diameter or particle size distribution by any of the heretofore known methods, for example, sieving, filtration, centrifugal precipitation, or spontaneous precipitation of a dispersion containing the microcapsules in a water-based medium as it is or after dilution with an arbitrary water-based medium. In this connection, for microcapsules having a relatively great particle diameter, a sieving method may be effective.

The washing of microcapsules may be carried out by repeating the following operations: precipitating the microcapsules by any of the heretofore known methods, for example, centrifugal precipitation or spontaneous precipitation of a dispersion containing the microcapsules in a water-based medium as it is or after dilution with an arbitrary water-based medium; discarding the supernatant solution; recovering the precipitate; and again dispersing the precipitate in an arbitrary water-based medium. For microcapsules having a relatively great particle diameter, it may be preferred to employ spontaneous precipitation in order to avoid the breakage or damage of the microcapsules.

(Formation of Outer Shell)

Then, after microcapsules each enclosing a core substance in an inner shell are dispersed in a water-based medium, an epoxy group-containing compound (hereinafter sometimes referred to as the "epoxy compound") is added, and an outer shell made of an epoxy resin is formed on the outer surface of the inner shell. This operation gives microcapsules each enclosing a dispersion containing electrophoretic particles and a solvent in a shell having an inner shell made of a mercapto group-containing amino resin and an outer shell made of an epoxy resin.

The water-based medium for dispersing microcapsules each enclosing a core substance in an inner shell may include water-based mediums recited above as the water-based medium for dispersing the core substance when the inner shell is formed. Since microcapsules each enclosing a core substance in an inner shell can be obtained in the form of a dispersion of the microcapsules in the water-based medium, the microcapsules may be subjected, without being separated or dispersed again in a water-based medium, to the step of forming an outer shell in the form of a dispersion of the microcapsules in the water-based medium as it is or after concentration or dilution.

The epoxy compound is not particularly limited, but there may be preferred water-soluble epoxy compounds having two or more epoxy groups in one molecule, of which examples may include sorbitol polyglycidyl ether, sorbitan polyglycidyl ether, polyglycerol polyglycidyl ether, pentaerythritol polyglycidyl ether, triglycidyltris-(2-hydroxyethyl) isocyanurate, trimethylolpropane polyglycidyl ether, neopentyl glycol diglycidyl ether, polyethylene glycol diglycidyl ether, polypropylene glycol diglycidyl ether, and adipic acid diglycidyl ether. These epoxy compounds may be used alone, or two or more of these epoxy compounds may also be used in combination.

The weight-average molecular weight of an epoxy compound may preferably have a lower limit of 300 and it may preferably have an upper limit of 100,000, more preferably 75,000, and still more preferably 50,000. If the weight-average molecular weight of an epoxy compound is lower than 300, it may become impossible to obtain an outer shell having sufficient strength. To the contrary, if the weight-average molecular weight of an epoxy compound is higher than 100,000, the viscosity of the reaction system may be increased to make stirring difficult.

The addition amount of an epoxy compound is not particularly limited, but it may preferably have a lower limit of 0.5 parts by mass, relative to 1 part by mass of a core substance, and it may preferably have an upper limit of 10 parts by mass, more preferably 5 parts by mass, and still more preferably 3 parts by mass, relative to 1 part by mass of a core substance. The thickness of an outer shell can easily be controlled by adjusting the addition amount of the epoxy compound. If the addition amount of an epoxy compound is lower than 0.5 parts by mass, it may become impossible to form a sufficient amount of an outer shell, or the thickness of an outer shell may become thinner, so that the strength of the outer shell may be lowered. To the contrary, if the addition amount of an epoxy compound is greater than 10 parts by mass, the thickness of an outer shell may become thicker, so that the flexibility and transparency of the outer shell may be lowered.

The method of adding the epoxy compound to a water-based medium is not particularly limited, but either of collective addition or successive addition (continuous addition and/or intermittent addition) may be employed. The addition of a preliminary condensation product may be preferred to be carried out under stirring using any of the heretofore known stirring apparatuses after microcapsules each enclosing a core substance in an inner shall are dispersed in the water-based medium.

When an outer shell made of an epoxy resin is formed, a reaction of the epoxy compound with a crosslinking agent may be carried out. The reaction of the epoxy compound with a crosslinking agent can improve the strength of an outer shell, and therefore, the strength of shells, so that the breakage or damage of the shells can effectively be suppressed when the microcapsules are thereafter separated or washed.

The crosslinking agent is not particularly limited, but examples of the crosslinking agent may include sodium diethyldithiocarbamate (including its hydrate), diethylammonium diethyldithiocarbamate (including its hydrate), dithiooxalic acid, and dithiocarbonic acid. These cross-linking agents may be used alone, or two or more of these crosslinking agents may also be used in combination.

The addition amount of a crosslinking agent is not particularly limited, but it may preferably have a lower limit of 1 part by mass, more preferably 5 parts by mass, and still more preferably 10 parts by mass, relative to 100 parts by mass of an epoxy compound, and it may preferably have an upper limit of 100 parts by mass, more preferably 90 parts by mass, and still more preferably 80 parts by mass, relative to 100 parts by mass of an epoxy compound. If the addition amount of a crosslinking agent is lower than 1 part by mass, it may become impossible to sufficiently improve the strength of an outer shell. To the contrary, if the addition amount of a crosslinking agent is higher than 100 parts by mass, since the cross-linking agent may react on the epoxy group of the epoxy compound to an excess extent, the flexibility of an outer shell may be decreased.

The method of adding a crosslinking agent to a water-based medium may be a method of adding a cross-linking agent together with the epoxy compound or a method of adding a crosslinking agent before or after the addition of the epoxy compound, although it is not particularly limited thereto, but it may be preferred to dropwise add a crosslinking agent in the form of an aqueous solution under stirring after a while from the addition of the epoxy compound in the form of an aqueous solution to a water-based medium in which microcapsules each enclosing a core substance in an inner shell are dispersed.

When an outer shell made of an epoxy resin is formed, an epoxy-melamine condensation product may be added in addition to the epoxy compound. The addition of an epoxy-melamine condensation product can improve the impermeability of an outer shell, and therefore, the impermeability of shells, so that microcapsules can be provided with higher performance.

The epoxy-melamine condensation product may be a preliminary condensation product produced from the epoxy compound, melamine, and formaldehyde by any of the heretofore known methods, although it is not particularly limited thereto, but it can further be reacted with at least one compound selected from the group consisting of urea, thiourea, benzoguanamine, acetoguanamine, and cyclohexylguanamine. Preferred examples of the epoxymelamine condensation product may include a condensation product produced by the reaction of a compound, which is obtained by the reaction of the epoxy compound with urea, with a preliminary condensation product, which is obtained by the reaction of melamine, urea, and formaldehyde.

The addition amount of an epoxy-melamine condensation product is not particularly limited, but it may preferably have a lower limit of 0 parts by mass, relative to 1 part by mass of an epoxy compound, and it may preferably have an upper limit of 10 parts by mass, more preferably 8 parts by mass, and still more preferably 5 parts by mass, relative to 1 part by mass of an epoxy compound. If the addition amount of an epoxy-melamine condensation product is greater than 10 parts by mass, an outer shell may become fragile, so that the strength of the outer shell may be decreased.

The method of adding an epoxy-melamine condensation product to a water-based medium may be carried out, together with the addition of the epoxy compound, or before or after the addition of the epoxy compound, although it is not particularly limited thereto, but it may be preferred to add an epoxy-melamine condensation product in the form of an aqueous solution after a while from the addition of the epoxy compound in the form of an aqueous solution to a water-based medium in which microcapsules each enclosing a core substance in an inner shell are dispersed. When the reaction of a crosslinking agent is carried out, it may be preferred to dropwise add the crosslinking agent in the form of an aqueous solution after a while from the addition of an epoxy-melamine condensation product in the form of an aqueous solution.

The temperature for forming an outer shell is not particularly limited, but it may preferably have a lower limit of 25° C., more preferably 30° C., and still more preferably 35° C., and it may preferably have an upper limit of 80° C., more preferably 70° C., and still more preferably 60° C. The reaction time for forming an outer shell is not particularly limited and it may appropriately be set in accordance with the feed amounts.

After an outer shell is formed, an aging period may be provided. The temperature for the aging is not particularly limited, but it may preferably be a temperature equal to or slightly higher than the temperature for forming an outer shell. The aging period is not particularly limited, but it may preferably have a lower limit of 0.5 hours, more preferably 1 hour, and it may preferably have an upper limit of 5 hours, more preferably 3 hours.

After an outer shell is formed, the microcapsules thus obtained may be separated from the water-based medium by any of the heretofore known methods, for example, suction filtration or spontaneous filtration, if necessary, but since the solvent of a core substance may leak and be evaporated, if the microcapsules are kept in a dry state, and it results in the deformation of the microcapsules, it may be preferred to subject the microcapsules to the next process without separating the microcapsules from the water-based medium.

The microcapsules obtained at the step of forming an outer shell may be preferred to be classified to obtain the microcapsules in a narrow particle size distribution and/or may be preferred to be washed to remove impurities to improve product quality.

The classification and washing of the microcapsules can be carried out in the same manner for microcapsules obtained at the step of forming an inner shell, and therefore, their explanation will be omitted herein.

<Other Ingredients>

The coating composition of the present invention can contain, besides microcapsules and a binder resin, any other ingredients, if necessary. Example of the other ingredients may include dispersants, viscosity modifiers, preservatives, and defoamers.

Examples of the dispersants may include polyacrylate salts; styrene-maleic acid copolymer salts; formalin condensates of naphthalene sulfonic acid salts; long-chain alkyl organic sulfonic acid salts; polyphosphonic acid salts; long-chain alkyl amine salts; polyalkylene oxides; polyoxyalkylene alkyl ethers; sorbitan fatty acid esters; fluorine-type surfactants such as perfluoroalkyl group-containing salts, perfluoroalkyl group-containing esters, and perfluoroalkyl group-containing oligomers; and non-ionic surfactants such as those of the acetylene diol type and those of the acetylene glycol type. These dispersants may be used alone, or two or more of these dispersants may also be used in combination.

Examples of the viscosity modifiers may include cellulose-type viscosity modifiers such as carboxymethylcellulose, methylcellulose, and hydroxyethylcellulose; polycarboxlic acid-type viscosity modifiers such as sodium polyacrylates, alkali-soluble emulsions, and associated-form alkali-soluble emulsions; polyethylene glycol-type viscosity modifiers such as polyethylene glycol, polyethyleneglycol alkyl ether, polyethylene glycol alkyl esters, and associated-form polyethylene glycol derivatives; other water-soluble polymer-type viscosity modifiers such as polyvinyl alcohol; and smectite-type viscosity modifiers such as montmorillonite, hectorite, and saponite. These viscosity modifiers may be used alone, or two or more of these viscosity modifiers may also be used in combination.

Examples of the preservatives may include organic nitrogen sulfur compounds, organic nitrogen halogen compounds, chlorhexidine salts, cresol-type compounds, bromine-type compounds, aldehyde-type compounds, benzimidazole-type compounds, halogenated cyclic sulfur compounds, organic arsenic compounds, organic copper compounds, isothiazolone chloride, and isothiazolone. These preservatives may be used alone, or two or more of these preservatives may also be used in combination.

Examples of the defoamers may include silicone-type defoamers, Pluronic-type defoamers, mineral oil-type defoamers, polyester-type defoamers, and polyether-type defoamers. These defoamers may be used alone, or two or more of these defoamers may also be used in combination.

When other ingredients are added to the coating composition of the present invention, the amounts of these other ingredients to be added are not particularly limited, so long as they do not inhibit the application of the coating composition to base material sheets and the effects of using these other ingredients can be obtained.

<Physical Properties of Coating Composition>

The viscosity of the coating composition is not particularly limited, but it may preferably have a lower limit of 500 mPa·s, more preferably 800 mPa·s, and it may preferably have an upper limit of 5,000 mPa·s, more preferably 4,000 mPa·s, and still more preferably 3,000 mPa·s. If the viscosity of the coating composition is within the above range, for example, the microcapsules of the present invention can be arranged in one layer without any gaps on a base material film, thereby making it possible to finish a coated film (i.e., a coated layer) in such a condition that the microcapsules of the present invention are densely filled on the base material film.

<<Sheet for Electrophoretic Display Devices>>

The sheet for electrophoretic display devices according to the present invention (hereinafter sometimes referred to as "the display sheet of the present invention" or simply the "display sheet") comprises a microcapsule layer formed from the coating composition of the present invention on a base material sheet.

The following will describe in detail the display sheet of the present invention. However, the display sheet of the present invention is not restricted to the following descriptions, and besides the following exemplified matter, it can be put into practice after appropriate modifications or variations within such a range that the gists of the present invention are not adversely affected.

<Base Material Sheet>

The display sheet of the present invention is a display sheet for electrophoretic display devices, and therefore, as the base material sheet, there can be used, for example, metal foils, glass substrates, electrically conductive films, and the like. Specific examples of the metal foils may include stainless plates, copper plates, and aluminum plates. Specific examples of the glass substrates may include electrode glass substrates with electronically conductive layers formed from metals, ITO, electrically conductive polymers, and the like. Specific examples of the electrically conductive films may include electrode films which can be used as the electrodes of electrophoretic display devices. The electrode films may be, for example, either of non-transparent electrode films or transparent electrode films (e.g., PET films with ITO), although they are not particularly limited, but may preferably be transparent electrode films; in particular, when the microcapsule layer of the present invention is laminated with two opposite electrode films as described above, it requires that at least one of the electrode films is transparent. The electrode film has an electrically conductive layer formed on a base material film and has a function to support a microcapsule layer on the electronically conductive layer. The thickness of the electronically conductive layer may be similar to that of the electronically conductive layer used in any of the heretofore known electrophoretic display devices, although it is not particularly limited thereto.

The material of the base material film may include acrylic resins, polyester resins, polyolefin resins, polycarbonate resins, and polyimide resins. In these resins, polyester resins may be preferred, and polyethylene terephthalate (PET) and polyethylene naphthalate (PEN) may particularly be preferred. The material of the electrically conductive layer may include inorganic electrically conductive substances such as indium tin oxide (ITO), zinc oxide, metal fine particles, and metal foils; and organic electrically conductive substances such as polyacethylene, polyaniline, polypyrrole, polyethylenedioxythiophene, and polythiophene. The method of forming an electrically conductive layer on a base material film may include dry coating methods such as vacuum deposition and spattering; and wet coating methods such as applying a dispersion or solution of an electrically conductive substance. Incidentally, the base material film may be prepared by oneself, or various kinds of commercially available base material films can be utilized.

The thickness of a base material sheet is not particularly limited, but may preferably be not thinner than 20 µm and not thicker than 200 µm. If the thickness of a base material sheet is thinner than 20 µm, wrinkles may easily occur on the base material sheet. To the contrary, if the thickness of a base material sheet is thicker than 200 µm, the roll diameter may become great when the base material sheet is wound around in the form of a roll, thereby making it difficult to handle the roll, or the amount of waste materials after use may become increased.

<Microcapsule Layer>

In the display sheet of the present invention, the microcapsules are arranged on a base material sheet in a manner of forming a plane-like form as a whole and fixed with a binder resin so as to keep their arrangement to form a microcapsule layer.

The display sheet of the present invention is a display sheet in which a microcapsule layer is formed on a base material sheet, or a display sheet in which, after a microcapsule layer is formed on a base material sheet, another base material sheet is further arranged so that the microcapsule layer is sandwiched between these base material sheets (e.g., the microcapsule layer is laminated with the base material sheets), both of which cases the microcapsule layer and the base material sheets are combined into one piece.

The thickness of a microcapsule layer may vary depending upon the particle diameters of the microcapsules, and therefore, it is not particularly limited, but it may preferably have a lower limit of 10 µm, more preferably 15 µm, and still more preferably 20 µm, and it may preferably have an upper limit of 200 µm, more preferably 150 µm, and still more preferably 100 µm. If the thickness of a microcapsule layer is thinner than 10 µm, sufficient display concentrations cannot be obtained in the display parts when such a microcapsule layer is used for an electrophoretic display device, so that the display parts cannot be clearly distinguished from the other non-display parts. To the contrary, if the thickness of a microcapsule layer is thicker than 200 µm, the electrophoretic particles in a dispersion enclosed into the microcapsules cannot exhibit sufficient electrophoretic properties when such a microcapsule layer is used for an electrophoretic display device, so that display characteristics such as contrast may become decreased or the driving voltage for display may become raised.

In the microcapsule layer, there may be the case where the microcapsules have the same shapes as those which are in the coating composition or the case where the microcapsule have been deformed through a drying step after coating. Further, there may be the case where the microcapsules have been deformed when an electrode film is laminated on the side of the microcapsule layer. In any case, the microcapsules may have a spherical shape or a deformed spherical shape. In the contact portions between the adjacent microcapsules or in the contact portions between the microcapsules and the base material sheet, the microcapsules may be deformed by compression to come into contact on their planes. In addition, the microcapsules may be uniformly arranged in a complete single layer or may partially be overlaid with each other or form a double layer, if the intended functions are not deteriorated. Further, depending upon the applications and purposes, the microcapsules may be supported in a single layer or in a double layer or may be discretely or densely supported, by the appropriate selection of coating machines and coating conditions.

<Others>

The display sheet of the present invention can be attached with another sheet material such as a release film, an electrode film, a surface protective film, and a colored film, or can be applied with another coating material on the surface thereof. In addition, the display sheet of the present invention can be used by attachment on another material such as such sheet-shaped or plate-shaped material. Further, the display sheet of the present invention may be used after processing into a desired size or shape.

<<Process for Producing a Sheet for Electrophoretic Display Devices>>

The process for producing a sheet for electrophoretic display devices according to the present invention (hereinafter sometimes referred to as "the production process of the present invention") comprises applying the coating composition of the present invention (hereinafter sometimes referred to as the "coating composition") on a base material sheet, followed by drying, to form a microcapsule layer on the base material sheet.

The following will describe in detail the production process of the present invention. However, the production process of the present invention is not restricted to the following descriptions, and besides the following exemplified matter, it can be put into practice after appropriate modifications or variations within such a range that the gists of the present invention are not adversely affected.

<Method of Application and its Apparatus>

The method of applying the coating composition to a base material sheet is not particularly limited, but may be a method of applying the coating composition one by one to a base material sheet using a coating apparatus such as an applicator and a blade coater or a method of continuously applying the coating composition to a base material sheet using a continuous coating apparatus such as a multi-coater. These methods may appropriately be selected according to need. Incidentally, as the base material sheet, there can be used, for example, an electrically conductive film.

The apparatus for applying the coating composition on a base material sheet is not particularly limited, but there can be used any of the coating apparatuses utilized for ordinary microcapsule coating techniques. There may preferably be used continuously coating apparatuses employing the kiss coating system as the fundamental coating system.

In the kiss coating system, a coating roll with the coating composition attached thereto comes in contact with a continuously running base material sheet while the roll is rotated, to transfer the coating composition from the coating roll onto the base material sheet, whereby the coating composition is applied to the base material sheet. In this case, at a position where the base material sheet is brought into contact with the coating roll, the surface of the base material sheet, opposite to the contact surface of the coating roll, is opened, and there are neither pressure rolls nor backup rolls in an ordinary roll coater or gravure coater.

The base material sheet is brought into contact with the coating roll at such an extent of a pressure that the sheet is slightly pressed against the coating roll. Specifically, guiding rolls are arranged upstream and downstream, relative to the base material sheet, from the position of contact with the coating roll. The base material sheet running straight along the tangential line direction between the guiding rolls is deformed to be slightly bent by the coating roll. The pressure caused by the bending deformation of the base material sheet acts between the base material sheet and the coating roll.

In a coating apparatus of the kiss coating system, the running direction of a base material sheet and the rotating direction of a coating roll may be set to be the same direction, or may be set to be reverse. Alternatively, they may be set to have a difference of speed in the same direction.

A coating technique in which the rotating direction of a coating roll is set in a direction reverse to the running direction of a base material sheet is called the reverse coating system. In the reverse coating system, the coating composition attached to the coating roll is transferred onto the base material sheet at a point of contact with the base material sheet. At this point of contact, the base material sheet and the coating roll slightly come in contact with each other, so that an excessive pressure cannot be applied to the microcapsules. In addition, at the point of contact, the coating composition is pulled from both of the base material sheet and the coating roll, whereby, an appropriate shearing stress is applied, so that the coating composition can uniformly be transferred onto the base material sheet.

When the rotation direction of a coating roll is the same as the running direction of a base material sheet, it is not the reverse coating system; however, so far as it is the kiss coating system, the base material sheet and the coating roll only slightly come in contact with each other at the above point of contact between the coating roll and the base material sheet, so that an excessive pressure cannot be applied to the microcapsules.

When an appropriate difference is set between the circumferential speed of a coating roll and the running speed of a base material sheet, the coating composition is stretched on the base material sheet by its difference of speed, so that a thin and uniform coated film can easily be formed.

A coating speed, that is, the running speed of a base material sheet, although it is not particularly limited, may appropriately be set depending upon drying conditions or the like after coating. For example, the running rate may preferably be set at from 0.1 to 10 m/min. When the running speed is lower than 0.1 m/min, productivity may be decreased. To the contrary, when the running rate is higher than 10 m/min, the drying of the coating composition may become poor, so that blocking may easily be caused.

The thickness of the coating composition applied to a base material sheet, although it is not particularly limited, may appropriately be set depending upon the average particle diameter of the microcapsules contained in the coating composition. For example, the thickness of the coating composition may preferably be set to be from 10 to 300 μm in a wet state, and may preferably be set to be from 10 to 200 μm in thickness after drying, more preferably from 15 to 150 μm in thickness after drying, and still more preferably from 20 to 100 μm in thickness after drying. Therefore, the thickness of a microcapsule layer may preferably be from 10 to 200 μm in thickness after drying.

In a coating apparatus of the kiss coating system, a coating roll can be arranged so that it can approach a base material sheet, or it can be moved away from the base material sheet during coating work. The adjustment of an interval between the coating roll and the base material sheet in this manner makes possible the precise adjustment of a coating thickness. When the coating roll is completely moved away from the base material sheet, the coating composition can discontinuously be applied in the length direction of the base material sheet. In this case, there can be produced a sheet for electrophoretic display devices, in which microcapsule layers are discontinuously arranged in the length direction.

<Microgravure Coater>

As the apparatus for applying the coating composition to a base material sheet, there can preferably be used a microgravure coater. The microgravure coater is of the kiss system, and is known as a coating apparatus of the reverse system. Specifically, the microgravure coater is based on a coating technique disclosed in Japanese Patent Publication No. Hei 5-53553.

The coating roll has a gravure pattern on an external circumferential surface. The gravure pattern is a pattern-shaped design consisting of fine irregularities, and the coating composition attached to the gravure pattern is transferred in such a condition that the coating composition is surely supported by the irregularities of the gravure pattern, and is then applied to a base material sheet. The microcapsules in the coating composition may easily be scooped up or transferred by the irregularities of the gravure pattern. In addition, only liquid components in the coating composition can be prevented from attaching to the surface of a coating roll.

Regarding the size and shape of a gravure pattern, conditions suitable for the supporting of the microcapsules can be selected from those which have been employed in a microgravure coater utilized for the coating of an ordinary paint or ink. For example, the depth and pitch interval of a gravure pattern can be set depending upon the average particle diameter of the microcapsules dispersed in the coating composition. As the pattern shape, slant lines which are inclined relative to the axial direction of a coating roll can be arranged spirally on the circumferential surface of the coating roll. Alternatively, a lattice-like gravure pattern can be formed by slant lines which are mutually crossed. Besides, there can be employed any gravure patterns which have been employed for any of the ordinary microgravure rolls.

For applying the coating composition containing the microcapsules having a relatively large average particle diameter, the groove of a gravure pattern may effectively be set deep and great.

The cell volume of a gravure pattern, although it is not particularly limited, may preferably be set to be from 50 to 200 mL/m². When the cell volume is too small, it may become difficult to support the microcapsules having a great average particle diameter. To the contrary, when the cell volume is too great, the irregularities of a gravure pattern may be transferred onto a coated film, and it may become difficult to uniformly arrange the microcapsules.

The external diameter of a coating roll is set to be remarkably smaller than the external diameter of a coating roll in an ordinary gravure coater. The external diameter, although it may vary depending upon the constituents of the coating composition and the coating conditions, may preferably be from 20 to 60 mm in diameter.

The rotation of a coating roll is in the direction reverse to the running direction of a base material sheet, and the rotation number of a coating roll may vary depending upon other conditions, e.g., the running speed of a base material sheet. When there is appropriately set the rotation number of a coating roll relative to the running speed of a base material sheet, that is, the circumferential speed, the microcapsules can uniformly be supported on the base material sheet. The ratio of the circumferential speed of a coating roll relative to the running speed of a base material sheet, that is, the ratio of speed may preferably be set to be two to twenty. When the ratio of speed is too small, the amount of the coating composition to be coated may be deficient, or the uniformity of the microcapsules supported on the base material sheet may be reduced. When the ratio of speed is too great, the rotation of a coating roll may become too fast, so that the efficiency of transferring the coating composition from a coating roll onto a base material sheet may be reduced, whereby the amount of the coating composition to be coated may be deficient, or the coating composition may be overflown from the reservoir thereof.

In the microgravure coater, a doctor blade mechanism may be provided on a front side before a coating roll comes in contact with a base material sheet. The doctor blade mechanism is effective for adjusting the amount of the coating composition to be attached to the coating roll, to supply the appropriate amount of the coating composition to a base material sheet.

<Drying of Coated Film>

The coating composition applied to a base material sheet is dried, so that the microcapsules are supported on a base material sheet. When a binder resin is incorporated into the coating composition, the binder resin is cured to have the function of bonding the microcapsules to the base material sheet.

As the drying method, there may be used any of the heretofore known drying techniques, although it is not particularly limited thereto. Examples of the drying method may include natural drying and forced drying. As the forced drying means, there can be used any of the heretofore known drying means such as hot air and farinfrared ray. The drying conditions, although they are not particularly limited, may appropriately be set depending upon the viscosity of a coating composition and the area of a coated film. For example, the drying temperature may preferably have a lower limit of 15° C., more preferably 20° C., and it may preferably have an upper limit of 150° C., more preferably 120° C. The drying time may preferably have a lower limit of 1 minute, more preferably 5 minutes, and it may preferably have an upper limit of 60 minutes, more preferably 45 minutes.

<Method of Lamination>

In the production process of the present invention, when a display sheet is produced, in which another base material sheet (e.g., an opposite electrode film) is laminated on the side of a microcapsule layer formed on a base material sheet, a method of lamination is not particularly limited, but there can be employed any of the heretofore known laminating techniques and laminating conditions.

When a laminated display sheet is produced, in order to obtain an electrophoretic display device which can stably exhibit excellent display quality, generally, the display sheet may be preferred to have sufficient adhesiveness (wide contact surface area) of the microcapsules to both base material sheets (e.g., a pair of electrode films). If the adhesiveness to both base material sheets (e.g., a pair of electrode films) is low, the response of electrophoretic particles may be lowered or the contrast may be decreased. To improve the adhesiveness, it is supposed to increase the temperature and pressure for lamination. In addition, with respect to the microcapsules to be used, the content ratios of components forming a shell may appropriately be set to increase flexibility and adhesiveness, and accordingly, the easiness of the adhesion of the microcapsules to the electrode films can further be improved. In this case, even if conditions such as temperature and pressure for lamination are moderated to a certain extent, sufficient adhesiveness can be obtained.

<<Electrophoretic Display Device>>

The display sheet of the present invention can be used, for example, as the constituent element of a data displaying part for electrophoretic display devices. The electrophoretic display device of the present invention comprises a data displaying part, wherein the data displaying part comprises the display sheet of the present invention. The electrophoretic display device of the present invention is the same as any of the heretofore known electrophoretic display devices, except that the data displaying part comprises the display sheet of the present invention. For this reason, parts other than the data displaying part, for example, a driving circuit and an electric power supply circuit, may be constructed in the same manner as in any of the heretofore known electrophoretic display devices. In other words, the electrophoretic display device of the present invention can be obtained by constructing the data displaying part in any of the heretofore known electrophoretic display devices with the display sheet of the present invention. In the present invention, the data displaying part alone may be referred to as an electrophoretic display device by incorporating the driving circuit and the electric power supply circuit into an external circuit.

As the electrophoretic display device of the present invention, an electrophoretic display device comprising, as the constituent element of a data displaying part, a display sheet obtained by laminating a layer containing the microcapsules and a binder resin between two opposed electrode films is preferably exemplified from the display sheets of the present invention. In such an electrophoretic display device, various constituent parts other than the display sheet (e.g., a driving circuit and an electric power supply circuit) may be those which are used in the heretofore known electrophoretic display devices, as described above.

The required display action in the electrophoretic display device of the present invention can be carried out by applying a controlled voltage to the opposed electrode films (e.g., applying a voltage only to the parts where desired images are to be displayed), thereby changing the oriented positions of electrophoretic particles in the microcapsules. If a driver layer including thin film transistors using amorphous silicon or polysilicon or organic transistors using organic molecules is formed in one electrode film, the display control can be carried out. Alternatively, without forming a driver layer, the display control may be carried out by an outer device. The means for display control may appropriately be selected depending upon the applications of the electrophoretic display device and is not particularly limited.

<<Electronic Equipments>>

The electrophoretic display device obtained using the display sheet of the present invention can be used, for example, as a data displaying means for electronic equipments. The electronic equipment of the present invention comprises a displaying means, wherein the data displaying means comprises the electrophoretic display device of the present invention. The "data displaying means" as used herein refers to a means for displaying character data, image data, and the like. The electronic equipment of the present invention is the same as any of the heretofore known electronic equipments, except that the data displaying means comprises the electrophoretic display device of the present invention. Therefore, parts other than the data displaying means may be the same as those of the heretofore known electronic equipments. That is, the electronic equipment of the present invention can be obtained by replacing the data displaying means in any of the heretofore known electronic equipments with the electrophoretic display device of the present invention.

The electronic equipment to which the electrophoretic display device of the present invention can be applied is not particularly limited, so long as the electronic equipment comprises a data displaying means. Examples of the electronic equipment may include personal computers, work stations, word processors, IC cards, IC tags, electronic notepads, electronic dictionaries, IC recorders, electronic books, electronic papers, electronic notebooks, electronic calculators, electronic newspapers, electronic white boards, direction boards, advertisement boards, various types of displays, TV sets, DVD players, digital still cameras, view finder-type or monitor direct view-type video cameras, car navigation systems, mobile phones, videophones, pagers, mobile terminals, POS terminals, and various kinds of equipments having touch panels. These electronic equipments have heretofore been known, and the electronic equipment of the present invention can be obtained by replacing their data displaying means with the electrophoretic display device of the present invention.

EXAMPLES

The present invention will be described below in detail by reference to Examples, but the present invention is not limited to these Examples. The present invention can be put into practice after appropriate modifications or variations within a range meeting the gists described above and later, all of which are included in the technical scope of the present invention. In the following Examples, "% by mass" and "parts by mass" may be expressed by "%" and "parts," respectively.

First, the following will describe a method of measuring the particle diameter of the microcapsules, a production method of electrophoretic display devices, and a method of evaluating electrophoretic display devices for adhesiveness and contrast.

<Particle Diameter of Microcapsules>

The particle diameter of the microcapsules was measured as their volume-average particle diameter using a laser scattering particle size distribution analyzer (trade name: LA-910, available from Horiba, Ltd.).

<Production Method of Electrophoretic Display Devices>

An electrophoretic display device was produced by attaching a microcapsules-coated sheet (i.e., a sheet for electrophoretic display devices) with a coated part having a length of 5 cm and a width of 3 cm on a PET film with ITO having a length of 6 cm, a width of 4 cm, and a thickness of 75 μm (a counter electrode) (by fixing them at arbitrary two points with a cellophane tape in a state that an uncoated part (i.e., an electrically conductive part) was left in one side, setting the attached sheet and film on a glass plate having a thickness of 2 mm, and laminating the sheet and film on the glass plate by allowing them to pass between two rolls.

The rolls were silicone rubber rolls having a roll diameter of 3 inch (7.62 cm), and the upper roll was heated by a heat medium to have the roll surface temperature (lamination temperature) of 50° C. or 100° C., rotated with a driving motor, and pressurized to the lower roll by air pressure of 0.2 mPa·s to keep 0 mm gap between the rolls. The lower roll was not heated and was rotated freely, and the roll position was fixed. The rolls were rotated at a feeding speed of 6 cm/min., and while the laminate face was set in the heated roll side, the attached sample was set on the glass plate and passed between the rolls.

<Adhesiveness>

The adhesiveness between the base material sheets and the microcapsule layer was evaluated on the following criteria by peeling off the laminated two PET films in an electrophoretic display device with hand fingers.

A: The microcapsule layer is completely destroyed to peel off the base material sheets.

B: The microcapsule layer is half destroyed to peel off the base material sheets.

C: The microcapsule layer is partly destroyed to peel off the base material sheets.

D: The base material sheets are peeled off without the microcapsule layer being destroyed.

<Contrast>

A direct current voltage of 40 V was applied between both electrodes of an electrophoretic display device for 0.4 seconds to carry out white display or black display, and the reflectance of each display was measured with a Macbeth spectroscopic densitometer (trade name: SpectroEye, available from GretagMacbeth), and the contrast (i.e., ratio of reflectance) was calculated by the following equation:

Contrast=reflectance of white display/reflectance of black display.

In this connection, the reflectance of white display and the reflectance of black display were separately measured by applying a voltage with changed polarity, and each reflectance is defined as an average of measurement values obtained for the entire one side face of the electrophoretic display device.

Then, the following will describe Synthesis Examples 1 to 10 of binder resins.

Synthesis Example 1

First, a 300-mL beaker was charged with 98 parts of 2-ethylhexyl acrylate, 1 part of 2-hydroxyethyl methacrylate, 1 part of acrylic acid, 1.5 parts of sodium polyoxyethylene alkyl ether sulfate (trade name: HITENOL LA-16, available from Dai-ichi Kogyo Seiyaku Co., Ltd.), and 30 parts of deionized water, followed by sufficiently stirring, to obtain a pre-emulsion.

Then, a 300-mL four-necked flask equipped with stirring blades, a thermometer, a reflux condenser, a dropping funnel, and a nitrogen gas introduction tube, was charged with 50 parts of deionized water, and the atmosphere in the flask was replaced with nitrogen gas, followed by heating to 70° C. To this flask was added 0.4 parts of a 10% aqueous ammonium persulfate solution, after which the above-described pre-emulsion was added dropwise over 3 hours, and at the same time, 7.6 parts of a 10% aqueous ammonium persulfate solution was added dropwise. After completion of the dropwise addition, the content of the flask was subjected to aging at 70° C. for 5 hours, and then cooled to room temperature, which was neutralized to pH 7.5 with 25% ammonia water, to obtain binder resin (B1) as a copolymer emulsion with a solid content of 55.0%. The binder resin (B1) thus obtained was dissolved in tetrahydrofuran, and a residual monomer concentration in the solid content of the binder resin (B1) was measured by gas chromatography to be 200 ppm. Table 1 shows the relative proportions of monomers in the binder resin obtained, the aging time after dropwise addition of monomers, the solid content of the binder resin, the residual monomer concentration in the solid content, and the glass transition temperature (Tg) of the binder resin. In Table 1, in the relative proportions of monomers in the binder resins, "BA" means n-butyl acrylate; "2EHA", 2-ethylhexyl acrylate; "MMA", methyl methacrylate; "HEMA", 2-hydroxyethyl methacrylate; and "AA", acrylic acid.

Synthesis Examples 2 to 10

The binder resins (B2) to (B10) as copolymer emulsions were obtained in the same manner as described in Synthesis Example 1, except that the relative proportions of monomers in the binder resins and the aging times after dropwise addition of monomers were changed as shown in Table 1. Table 1 shows the relative proportions of monomers in the binder resins obtained, the aging times after dropwise addition of monomers, the solid contents of the binder resins, the residual monomer concentrations in the solid contents, and the glass transition temperatures (Tgs) of the binder resins.

TABLE 1

| | Relative proportions of monomers in binder resins | | | | | Binder resins | | | |
| | (% by mass) Monomers and glass transition temperatures (Tgs) of their homopolymers | | | | | | Aging time | Solid content | Glass transition temp. | Residual monomer conc. |
| | BA 218.2 K | 2EHA 188.2 K | MMA 378.2 K | HEMA 328.2 K | AA 360.2 K | Type | T (hr) | (%) | Tg (° C.) | C (ppm) |
| Synthesis Example 1 | 0 | 98 | 0 | 1 | 1 | B1 | 5 | 55.0 | −85 | 180 |
| Synthesis Example 2 | 0 | 98 | 0 | 1 | 1 | B2 | 3 | 55.6 | −85 | 470 |
| Synthesis Example 3 | 44 | 45 | 9 | 1 | 1 | B3 | 5 | 55.3 | −60 | 170 |
| Synthesis Example 4 | 20 | 29 | 49 | 1 | 1 | B4 | 5 | 55.2 | −10 | 210 |
| Synthesis Example 5 | 20 | 29 | 49 | 1 | 1 | B5 | 3 | 56.0 | −10 | 490 |
| Synthesis Example 6 | 44 | 9 | 45 | 1 | 1 | B6 | 2 | 55.0 | −85 | 570 |

TABLE 1-continued

| | Relative proportions of monomers in binder resins (% by mass) Monomers and glass transition temperatures (Tgs) of their homopolymers | | | | | Binder resins | | | |
|---|---|---|---|---|---|---|---|---|---|
| | BA 218.2 K | 2EHA 188.2 K | MMA 378.2 K | HEMA 328.2 K | AA 360.2 K | Type | Aging time T (hr) | Solid content (%) | Glass transition temp. Tg (° C.) | Residual monomer conc. C (ppm) |
| Synthesis Example 7 | 20 | 29 | 49 | 1 | 1 | B7 | 2 | 54.9 | −10 | 590 |
| Synthesis Example 8 | 44 | 9 | 45 | 1 | 1 | B8 | 5 | 55.2 | −5 | 195 |
| Synthesis Example 9 | 44 | 3 | 51 | 1 | 1 | B9 | 5 | 55.7 | 5 | 220 |
| Synthesis Example 10 | 44 | 3 | 51 | 1 | 1 | B10 | 2 | 55.2 | 5 | 610 |

The following will describe Preparation Example of a dispersion for electrophoretic display devices.

<<Preparation of a Dispersion for Electrophoretic Display Devices>>

A 300-mL separable flask equipped with stirring blades, a thermometer, and a condenser tube was charged with 2 g of an acrylic polymer (having a weight-average molecular weight of 3,300) made of dodecyl methacrylate, 2-ethylhexyl acrylate, and glycidyl methacrylate (their relative proportion being 80:15:5), 20 g of carbon black (trade name: MA-100 R, available from Mitsubishi Chemical Corporation), and 78 g of Isoper M (available from ExxonMobil Chemical), and further charged with 800 g of zirconia beads having a diameter of 1 mm.

While the mixture was stirred at a rotation speed of 300 rpm, a polymer grafting treatment was carried out by causing a reaction at 160° C. for 2 hours. After the treatment, further 100 g of Isoper M was added, and the mixture was sufficiently mixed. After that, the zirconia beads were separated to obtain 150 g of a dispersion with a solid content of 11% containing carbon black subjected to the polymer grafting treatment (the epoxy groups of the acrylic polymer were reacted here with the carboxyl groups existing on the surface of the carbon black).

The particle diameter of electrophoretic particles contained in this dispersion was measured by a dynamic light scattering particle size analyzer (e.g., trade name: LB-500, available from Horiba, Ltd.), and it was found that their volume-average particle diameter was 0.2 μm.

On the other hand, a 300-mL separable flask equipped with stirring blades was charged with 50 g of titanium dioxide (trade name: Tipaque CR 90, available from Ishihara Sangyo Kaisha, Ltd.), 5 g of an acrylic polymer (having a weight-average molecular weight of 6,800) made of dodecyl methacrylate, 2-ethylhexyl acrylate, and γ-methacryloxypropyltrimethoxysilane (their relative proportion being 80:15:5), and 100 g of hexane, and the flask was put in an ultrasonic bath (trade name: BRANSON 5210, available from Yamato Kagaku Co., Ltd.) at 55° C., followed by ultrasonic dispersion treatment under stirring for 2 hours.

This separable flask was transferred to a hot water bath at 90° C., and the solvent was removed. The titanium dioxide which became in a powder state was taken out of the flask, transferred to a tray, and then heat treated in a dryer at 150° C. for 5 hours.

The titanium dioxide thus heat treated was dispersed in 100 g of hexane, and separated by centrifugation using a centrifugal separator, followed by washing. After this operation was repeated three times, the titanium dioxide was dried at 100° C.

A 300-mL separable flask was charged with 50 g of the titanium dioxide thus washing treated and 50 g of Isoper M, and the flask was put in an ultrasonic bath (trade name: BRANSON 5210, available from Yamato Kagaku Co., Ltd.) at 55° C., followed by ultrasonic dispersion treatment under stirring for 2 hours, to obtain a dispersion with a solid content of 50% containing titanium dioxide subjected to the polymer grafting treatment (the silyl groups of the acrylic polymer were reacted here with the hydroxy groups existing on the surface of the titanium dioxide).

The particle diameter of electrophoretic particles contained in this dispersion was measured by a dynamic light scattering particle size analyzer (e.g., trade name: LB-500, available from Horiba, Ltd.), and it was found that their voluime-average particle diameter was 0.5 pm.

A 200-mL mayonnaise bottle was charged with 6 g of the above dispersion of carbon black subjected to the polymer grafting treatment, 75 g of the above dispersion of titanium dioxide subjected to the polymer grafting treatment, and 19 g of Isoper M, and the content was sufficiently mixed to obtain a dispersion for electrophoretic display devices, having electrophoretic particle concentrations of 0.66% for carbon black and 37.5% for titanium dioxide.

The following will describe Preparation Example of the microcapsules for electrophoretic display devices.

<<Preparation of Microcapsules for Electrophoretic Display Devices>>

First, a 100-mL round-bottomed separable flask was charged with 8 g of melamine, 7 g of urea, 30 g of a 37% aqueous formaldehyde solution, and 3 g of 25% ammonia water, and the mixture was heated to 70° C. under stirring. After the mixture was kept at the same temperature for 2 hours, the mixture was cooled to 25° C. to obtain an aqueous solution (A-1) with a solid content of 54.6% containing a melamine-urea-formaldehyde preliminary condensation product.

A 500-mL flat-bottomed separable flask was charged with 120 g of an aqueous solution containing 20 g of gum arabic dissolved therein, and 100 g of the dispersion for electrophoretic display devices was added, while being stirred at 600 rpm using a disper (trade name: ROBOMICS, available from PRIMIX Corporation). After that, the stirring speed was changed to 1,600 rpm, followed by stirring for 2 minutes, and the stirring speed was changed to 1,000 rpm, and 100 g of water was added to obtain a suspension.

The suspension was put in a 300-mL four-necked separable flask equipped with a thermometer and a condenser tube, and while being kept at 40° C. and stirred by paddle blades, 48 g of the aqueous solution (A-1) was added. After 15 minutes, 100 g of an aqueous solution containing 2 g of L-cysteine dissolved therein was added dropwise by a dropping funnel over 5 minutes. While being kept at 40° C., the reaction was carried out for 4 hours, and the temperature was then increased to 50° C., and aging was carried out for 2 hours to obtain a dispersion of microcapsules each enclosing the dispersion for electrophoretic display devices in an inner shell made of a mercapto group-containing amino resin.

The dispersion thus obtained was cooled to 25° C. and filtered with a standard sieve having meshes of 75 μm to remove coarse capsules. Then, the microcapsule dispersion was put in a 2-L beaker, and water was added to adjust the entire amount to be 1,000 mL. The dispersion was kept still as it was to precipitate the microcapsules, and the supernatant solution was discarded. This operation was repeated three times to wash the microcapsules.

Then, water was added to the microcapsules to obtain 200 g of a dispersion, and the dispersion was transferred to the above flat-bottomed separable flask and heated to 40° C. under stirring.

To the microcapsule dispersion was added 100 g of an aqueous solution containing 15 g of polyglycerol polyglycidyl ether (trade name: Denacol EX-521 (having a weight-average molecular weight of 732 and a solubility in water of 100%), available from Nagase Chemtex Corporation), as an epoxy compound, dissolved therein. After 30 minutes, 50 g of an aqueous solution containing 2 g of sodium diethyldithiocarbamate dissolved therein was added dropwise by a dropping funnel over 5 minutes. While being kept at 40° C., the reaction was carried out for 3 hours, and the temperature was then increased to 50° C., and aging was carried out for 1 hour to obtain a dispersion of the microcapsules each enclosing the dispersion for electrophoretic display devices in a shell having an inner shell made of a mercapto group-containing amino resin and an outer shell made of an epoxy resin and formed on the outer surface of the inner shell.

The dispersion thus obtained was cooled to 25° C. and filtered with a standard sieve having meshes of 53 μm to remove coarse capsules. Then, the microcapsule dispersion was put in a 2-L beaker, and water was added to adjust the entire amount to be 1,000 mL. The dispersion was kept still as it was to precipitate the microcapsules, and the supernatant solution was discarded. This operation was repeated three times to wash the microcapsules.

The particle diameter of the thus obtained microcapsules for electrophoretic display devices was measured by a laser scattering particle size distribution analyzer (trade name: LA-910, available from Horiba, Ltd.), and it was found that their volume-average particle diameter was 40.7 μm.

The following will describe Production Examples of sheets for electrophoretic display devices and electrophoretic display devices, and the evaluation of their performances.

Example 1

The microcapsules for electrophoretic display devices obtained above were suction-filtered to obtain a microcapsule paste for electrophoretic display devices with a solid content of 65%.

To 30 g of the paste obtained above was added 10 g of the binder resin (B1), followed by mixing by a hybrid defoaming mixer (trade name: Awatori Rentaro AR-100, available from THINKY Corporation) for 10 minutes, to obtain a coating solution composition.

The coating solution composition was applied to a PET film with ITO by an applicator and dried at 90° C. for 10 minutes to obtain a sheet for electrophoretic display devices.

Using the sheet for electrophoretic display devices, an electrophoretic display device was produced by the above-described method and evaluated for adhesiveness and contrast. The results are shown in Table 2.

Examples 2 to 5 and Comparative Examples 1 to 5

Sheets for electrophoretic display devices and electrophoretic display devices were produced in the same manner as described in Example 1, except that each of the binder resins (B2) to (B10) was used in place of the binder resin (B1), and the electrophoretic display devices thus obtained were evaluated for adhesiveness and contrast. The results are shown in Table 2.

TABLE 2

| | Binder resins | | | Lamination temperatures | | | |
| | | Glass transition temp. | Residual monomer conc. | 50° C. | | 100° C. | |
| | Type | Tg (° C.) | C (ppm) | Adhesiveness | Contrast | Adhesiveness | Contrast |
|---|---|---|---|---|---|---|---|
| Example 1 | B1 | −85 | 180 | A | 9 | A | 8 |
| Example 2 | B2 | −85 | 470 | A | 7 | A | 6 |
| Example 3 | B3 | −60 | 170 | B | 8 | A | 7 |
| Example 4 | B4 | −10 | 210 | B | 7 | B | 6 |
| Example 5 | B5 | −10 | 490 | B | 5 | B | 5 |
| Comparative Example 1 | B6 | −85 | 570 | A | 4 | A | 3 |
| Comparative Example 2 | B7 | −10 | 590 | B | 3 | B | 2 |
| Comparative Example 3 | B8 | −5 | 195 | C | 4 | B | 3 |
| Comparative Example 4 | B9 | 5 | 220 | D | 3 | C | 2 |
| Comparative Example 5 | B10 | 5 | 610 | D | 2 | C | 1 |

As can be seen from Table 2, the electrophoretic display devices of Examples 1 to 5, which were produced using binder resins each having a glass transition temperature (Tg) in a range of from −85° C. to −10° C. as calculated by FOX formula and having a residual monomer concentration of 500 ppm or lower in the solid content thereof, had high adhesiveness between the base material sheets and the microcapsule layer, even if the lamination temperature was either of 50° C. or 100° C., and had high contrast, which reached at least 5.

In contrast, the electrophoretic display devices of Comparative Examples 1 and 2, which were produced using binders each having a glass transition temperature (Tg) in a range of from −85° C. to −10° C. as calculated by FOX formula but having a residual monomer concentration of higher than 500 ppm in the solid content thereof, had high adhesiveness between the base material sheets and the microcapsule layer, even when the lamination temperature was either of 50° C. or 100° C., and had low contrast, which ranged from 2 to 4.

In addition, the electrophoretic display device of Comparative Example 3, which was produced using a binder resin having a residual monomer concentration of 500 ppm or lower in the solid content thereof but having a glass transition temperature (Tg) out of a range of from −85° C. to −10° C. as calculated by FOX formula, had high adhesiveness between the base material sheets and the microcapsule layer, when the lamination temperature was 100° C., but had low adhesiveness between the base material sheets and the microcapsule layer and had low contrast, which ranged from 3 to 4, when the lamination temperature was 50° C. The electrophoretic display device of Comparative Example 4, which was produced using a similar binder resin, had low adhesiveness between the base material sheets and the microcapsule layer, even when the lamination temperature was either of 50° C. or 100° C., and had low contrast, which ranged from 2 to 3.

Further, the electrophoretic display device of Comparative Example 5, which was produced using a binder resin having a glass transition temperature (Tg) out of a range of from −85° C. to −10° C. as calculated by FOX formula and having a residual monomer concentration of higher than 500 ppm in the solid content thereof, had low adhesiveness between the base material sheets and the microcapsule layer, even when the lamination temperature was either of 50° C. or 100° C., and had very low contrast, which ranged only from 1 to 2.

Thus, it can be understood that the use of a binder resin having a glass transition temperature (Tg) in a range of from −85° C. to −10° C. as calculated by FOX formula and having a residual monomer concentration of 500 ppm or lower in the solid content thereof makes it possible to produce electrophoretic display devices having high adhesiveness between the base material sheets and the microcapsule layer and having improved contrast.

The following will describe Production Examples of electronic equipments using electrophoretic display devices.

Example 6

FIG. 1 is a plan view showing one example of an IC card which is one embodiment of the electronic equipment of the present invention. IC card 10 has two operation buttons 11 and 11, and display panel 12. In the IC card 10, display panel 12 as a data displaying means is the electrophoretic display device of the present invention.

Example 7

Figure 2:
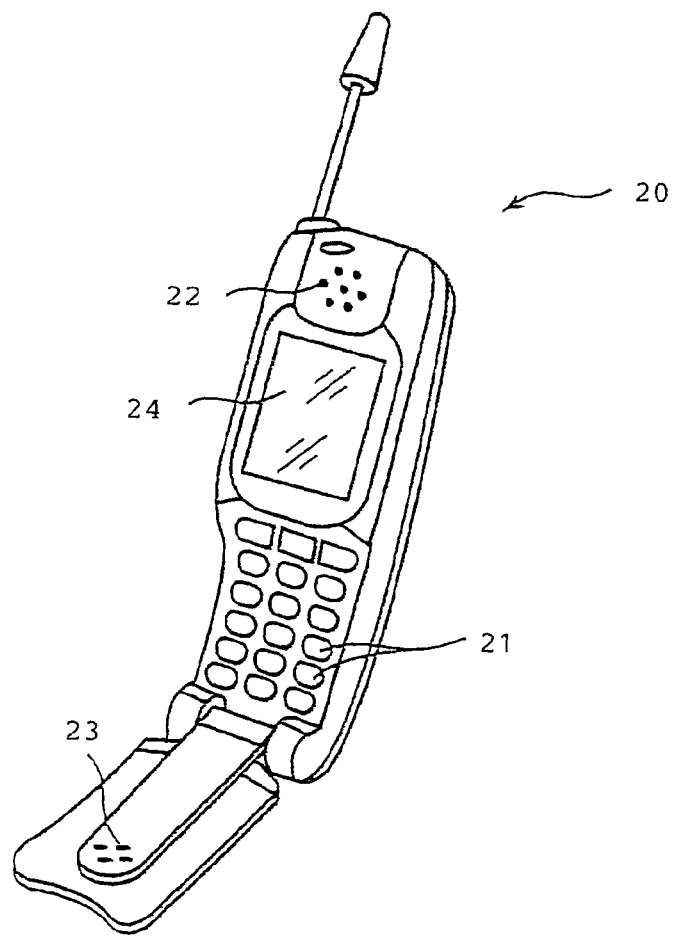
FIG. 2 is a perspective view showing one example of a mobile phone which is another embodiment of the electronic equipment of the present invention.

FIG. 2 is a perspective view showing one example of a mobile phone which is another embodiment of the electronic equipment of the present invention. Mobile phone 20 has two or more buttons 21, . . . , and 21, earpiece 22, mouthpiece 23, and display panel 24. In the mobile phone 20, display panel 24 as a data displaying means is the electrophoretic display device of the present invention.

Example 8

Figure 3:
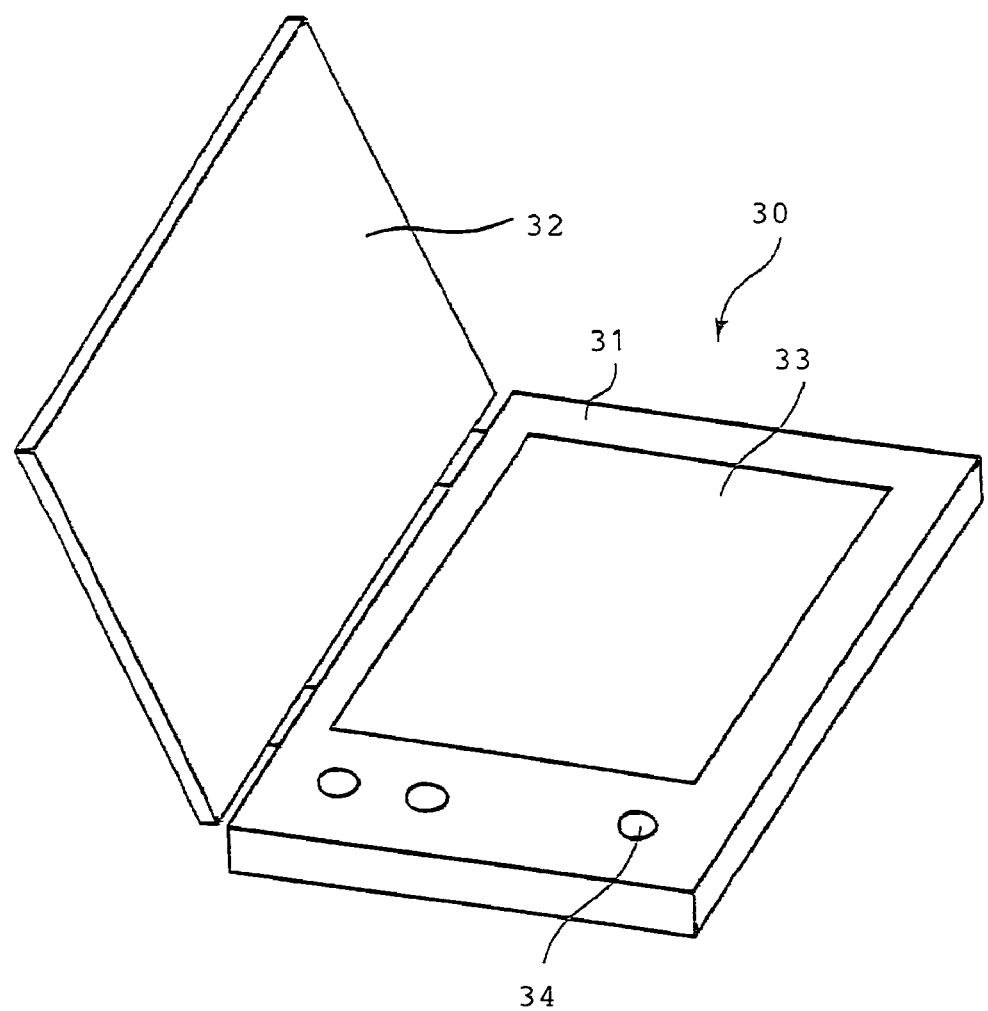
FIG. 3 is a perspective view showing one example of an electronic book which is still another embodiment of the electronic equipment of the present invention.

FIG. 3 is a perspective view showing one example of an electronic book which is still another embodiment of the electronic equipment of the present invention. Electronic book 30 has a book-shaped frame 31, and cover 32 which is provided rotatably relative to the frame 31 (openable and closable). Frame 31 has display device 33 in the state where the display surface is opened, and operating portion 34. In the electronic book 30, display device 33 as a data displaying means is the electrophoretic display device of the present invention.

Example 9

Figure 4:
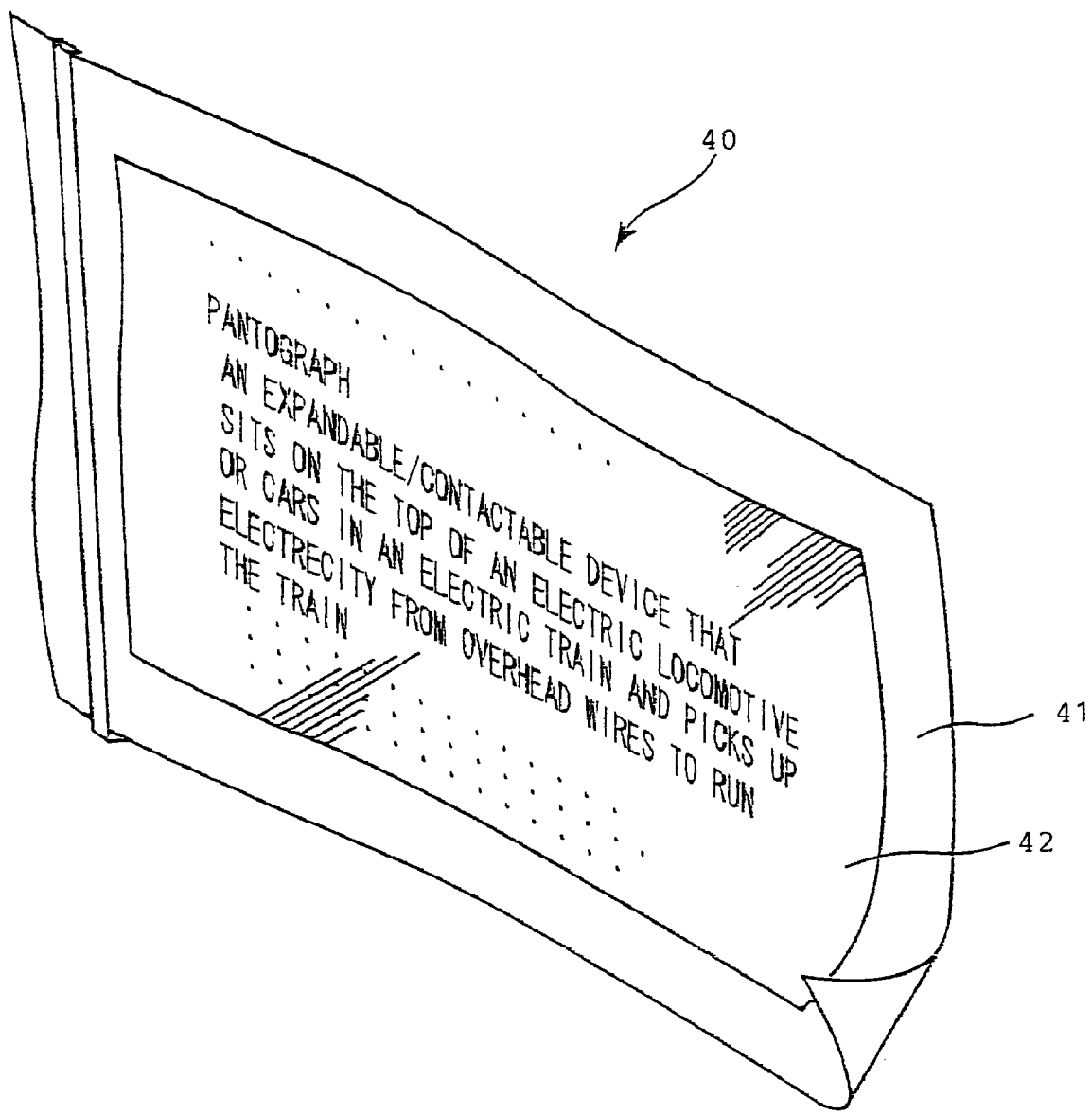
FIG. 4 is a perspective view showing one example of an electronic paper which is still another embodiment of the electronic equipment of the present invention.

FIG. 4 is a perspective view showing one example of an electronic paper which is still another embodiment of the electronic equipment of the present invention. Electronic paper 40 has body 41 formed of a re-writable sheet having the same texture and flexibility as those of a paper, and display unit 42. In the electronic paper 40, display unit 42 as a data displaying means is the electrophoretic display device of the present invention.

Each of the IC card of Example 6, the mobile phone of Example 7, the electronic book of Example 8, and the electronic paper of Example 9 comprises the electrophoretic display device of the present invention as the data displaying means, so that they are excellent in the display performance such as contrast.

The invention claimed is:

1. A coating composition for electrophoretic display devices, comprising microcapsules for electrophoretic display devices and a binder resin, wherein the binder resin has a glass transition temperature (Tg) in a range of from −85° C. to −10° C. as calculated by FOX formula and has a residual monomer concentration of 500 ppm or lower in a solid content thereof, and wherein each of the microcapsules comprises an inner shell made of a mercapto group-containing amino resin and an outer shell made of an epoxy resin and wherein the amino resin forming the inner shell and the epoxy resin forming the outer shell are bonded through the mercapto groups.

2. The coating composition for electrophoretic display devices according to claim 1, wherein the binder resin comprises a (meth)acrylic copolymer.

3. A sheet for electrophoretic display devices, comprising a microcapsule layer formed from a coating composition for electrophoretic display devices according to claim 1 on a base material sheet.

4. The sheet for electrophoretic display devices according to claim 3, wherein the base material sheet comprises an electrically conductive film.

5. An electrophoretic display device comprising a data displaying part, wherein the data displaying part comprises a sheet for electrophoretic display devices according to claim 3.

6. An electronic equipment comprising a data displaying means, wherein the data displaying means comprises an electrophoretic display device according to claim 5.

7. A process for producing a sheet for electro-phoretic display devices, comprising applying a coating composition for electrophoretic display devices according to claim 1 to a base material sheet, followed by drying, to form a microcapsule layer on the base material sheet.

8. The process according to claim 7, wherein the base material sheet comprises an electrically conductive film.

* * * * *